(12) United States Patent
Kilpatrick et al.

(10) Patent No.: US 10,503,160 B2
(45) Date of Patent: Dec. 10, 2019

(54) INTEGRATED TESTING MECHANISM FOR INDUSTRIAL PROCESS CONTROL AND AUTOMATION SYSTEMS

(71) Applicant: Honeywell International Inc., Morris Plains, NJ (US)

(72) Inventors: Cathleen F. Kilpatrick, Bethlehem, PA (US); Antoine Guillot, Doylestown, PA (US); Meenal Gharpure, Bangalore (IN); Michael James Waynick, Hatboro, PA (US); Yong Yang, Shanghai (CN)

(73) Assignee: Honeywell International Inc., Morris Plains, NJ (US)

( * ) Notice: Subject to any disclaimer, the term of this patent is extended or adjusted under 35 U.S.C. 154(b) by 302 days.

(21) Appl. No.: 15/487,714

(22) Filed: Apr. 14, 2017

(65) Prior Publication Data

US 2017/0357253 A1 Dec. 14, 2017

Related U.S. Application Data

(63) Continuation of application No. PCT/CN2016/085389, filed on Jun. 10, 2016.

(51) Int. Cl.
*G05B 23/02* (2006.01)
*G05B 19/042* (2006.01)

(52) U.S. Cl.
CPC ...... *G05B 23/0272* (2013.01); *G05B 19/0428* (2013.01); *G05B 23/0256* (2013.01); *G05B 23/0264* (2013.01)

(58) Field of Classification Search
CPC ............ G05B 23/0264; G05B 23/0256; G05B 23/0272; G05B 19/0428
See application file for complete search history.

(56) References Cited

U.S. PATENT DOCUMENTS

| | | | |
|---|---|---|---|
| 5,761,090 A | 6/1998 | Gross et al. | |
| 2009/0088884 A1 | 4/2009 | Yuan et al. | |
| 2010/0174395 A1 | 7/2010 | Gu et al. | |
| 2011/0054643 A1* | 3/2011 | Law .................... | G06F 11/3636 700/79 |
| 2012/0323367 A1* | 12/2012 | MacArthur .......... | G05B 13/048 700/267 |
| 2013/0218306 A1* | 8/2013 | Polzer ................ | G05B 19/0428 700/79 |

* cited by examiner

*Primary Examiner* — Vincent H Tran

(57) ABSTRACT

A method includes receiving information defining multiple functional configurations associated with an industrial process control and automation system. The functional configurations identify operations to be performed by the control and automation system. The method also includes receiving, at a test system integrated in the control and automation system, information defining multiple tests to be performed on the control and automation system. The method further includes executing the tests using the test system, where the test system accesses data from both the test system and the control and automation system.

14 Claims, 21 Drawing Sheets

FIG. 18

| | Project Engineering - Test - Baseline/Audit Details | | | | | | |
|---|---|---|---|---|---|---|---|
| File | Design | Build | Test | Commissioning | Help | | |

Home > Test > Baseline/Audit Details

Test Name: [LC_FV_102_XXYYZZ]  Type: [LOOPCHECK]  Category: [CAT]  Category: [FV_102_XXYYZZ]

Description: [Loopcheck test]  Keyword: [Module 1]  Status: [Module 1]

Baseline Timestamp: [09/01/2015 4:46 PM]  Audit Timestamp: [11/17/2015 2:27 PM]

Associated Entities:

| Type | Name | Description | Information |
|---|---|---|---|
| SERIES_C_IO:UIO_AOCHANNEL | FV_102_XXYYZZ | The AO Channel | Baseline: 08/07/2015 2:06PM Audit: Same |
| ⓘ SYSTEM-CONTROLMODULE | FIC_102 | Some CM | Baseline: 08/07/2015 3:21PM Audit: 06/13/2015 10:58AM |
| DISPLAY | SomeDisplayName | Some display | Baseline: 08/07/2015 6:11PM Audit: Same |

← 1802

Baseline/Audit Details

ⓘ Modified associated entity(ies) detected.

1800

1804 ↗

[Close]

2000

| Project Engineering - Commissioning - Execute CABINET_04_ADC- Automated Loopchecks | | | | | | | | | _ □ ⊠ |
|---|---|---|---|---|---|---|---|---|---|
| File | Design | Build | Test | Commissioning | Help | | | | |
| Home > | Commissioning > | | | Execute CABINET_04_ADC | Target: | CABINET_04 | | Status: | ▶ |

✓ Interrogate/Match  ✓ Assign/Load  ✓ Configure Devices  ▶ Automated Loopchecks  Assisted Loopchecks 1. Select devices to loopcheck automatically by checking their checkboxes or unselect them to exclude them from the question.
2. Click Automated Loopchecks button to proceed.

| ☐ | # | IO Module | Type | Channel Name | Device Name | Loopcheck Status ▼ | Information |
|---|---|---|---|---|---|---|---|
| ☑ | 01 | IOM_03-01 | AI | FT_401_XXYYZZ | FT_401_XXYYZZ | ▶ | |
| ☐ | 02 | IOM_03-01 | SPARE | | | ▶ | |
| ☑ | 03 | IOM_03-01 | AI | FT_403_XXYYZZ | FT_403_XXYYZZ | ▶ | |
| ☑ | 04 | IOM_03-01 | AO | FV_404_XXYYZZ | FV_404_XXYYZZ | ▶ | |
| ☐ | 05 | IOM_03-01 | SPARE | | | ▶ | |
| ☑ | 06 | IOM_03-01 | AO | FV_406_XXYYZZ | FV_406_XXYYZZ | ▶ | |
| ☑ | 07 | IOM_03-01 | AI | FT_407_XXYYZZ | FT_407_XXYYZZ | ▶ | |
| ☑ | 08 | IOM_03-01 | AO | FV_408_XXYYZZ | FV_408_XXYYZZ | ▶ | |
| ☐ | 09 | IOM_03-01 | AI | FI_409_XXYYZZ | | ▶ | FI_409_XXYYZZ not H.. |
| ☐ | 10 | IOM_03-01 | DO | FI_410_XXYYZZ | | ▶ | FI_410_XXYYZZ Digi.. |
| ☑ | 11 | IOM_03-01 | AI | FT_411_XXYYZZ | FT_411_XXYYZZ | ▶ | |
| ☑ | 12 | IOM_03-01 | AO | FV_412_XXYYZZ | FV_412_XXYYZZ | ▶ | |

64 Channels 60 Selected

Automated Loopchecks    Next Step  Restart Test  End Test

FIG. 20

INTEGRATED TESTING MECHANISM FOR INDUSTRIAL PROCESS CONTROL AND AUTOMATION SYSTEMS

TECHNICAL FIELD

This disclosure relates generally to industrial process control and automation systems. More specifically, this disclosure relates to an integrated testing mechanism for industrial process control and automation systems.

BACKGROUND

Industrial process control and automation systems are often used to automate large and complex industrial processes. These types of systems routinely include sensors, actuators, and controllers. Some of the controllers receive measurements from the sensors and generate control signals for the actuators. Other controllers perform higher-level functions, such as planning, scheduling, and optimization operations. It is often necessary or desirable to test the operation of an industrial process control and automation system in order to, for example, verify various functional and physical aspects of the control and automation system. However, this can be a difficult and time-consuming task as the number of tests to be executed can range into the tens to thousands.

SUMMARY

This disclosure provides an integrated testing mechanism for industrial process control and automation systems.

In a first embodiment, a method includes receiving information defining multiple functional configurations associated with an industrial process control and automation system. The functional configurations identify operations to be performed by the control and automation system. The method also includes receiving, at a test system integrated in the control and automation system, information defining multiple tests to be performed on the control and automation system. The method further includes executing the tests using the test system, where the test system accesses data from both the test system and the control and automation system.

In a second embodiment, an apparatus includes at least one processor configured to execute instructions for a test system integrated within an industrial process control and automation system. The at least one processor is configured to receive information defining multiple functional configurations associated with the control and automation system, where the functional configurations identify operations to be performed by the control and automation system. The at least one processor is also configured to receive information defining multiple tests to be performed on the control and automation system. The at least one processor is further configured to execute the tests while accessing data from both the test system and the control and automation system.

In a third embodiment, a non-transitory computer readable medium contains instructions that, when executed by one or more processors, cause the one or more processors to receive information defining multiple functional configurations associated with an industrial process control and automation system. The functional configurations identify operations to be performed by the control and automation system. The medium also contains instructions that, when executed by the one or more processors, cause the one or more processors to receive, at a test system integrated in the control and automation system, information defining multiple tests to be performed on the control and automation system. The medium further contains instructions that, when executed by the one or more processors, cause the one or more processors to execute the tests using the test system, where the test system accesses data from both the test system and the control and automation system.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which:

FIGS. 15 through 20 illustrate example graphical user interfaces of an integrated testing mechanism for industrial process control and automation systems according to this disclosure.

DETAILED DESCRIPTION

FIGS. 1 through 21, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

As described above, it is often necessary or desirable to test the operation of an industrial process control and automation system in order to, for example, verify various functional and physical aspects of the control and automation system. This can be a difficult and time-consuming task as the number of tests to be executed can range into the tens to thousands. Unfortunately, this tends to require a large amount of effort with little value for various reasons. For example, the same tests are often executed repeatedly because (i) users do not know if changes have occurred since prior tests were executed and conventional alternatives (such as tracking changes manually or locking out modifications) add undesirable overhead when modifications are required and (ii) new physical components become available and there is no way to isolate testing to focus only on the new physical components. Also, manual steps and testing may be needed to ensure consistency between different components, and manual steps and testing are prone to added effort and insert human error. Further, manual management and tracking of tests tend to require large effort because of the number of tests. Moreover, multiple electronic and paper inputs may need to be manually consolidated in order to track and document test results. In addition, large quantities of paper copies often need to be generated and maintained, and large amounts of specialized resources may be needed to execute and support test efforts.

This disclosure provides a system that integrates a testing infrastructure with an industrial process control and automation system. This can significantly reduce the overhead associated with testing in the control and automation system. As a result, test execution and test result tracking can leverage information available from both the test system and the control and automation system data sources. In addition, this approach provides flexibility so that the steps to be tested, the formats of the results, and the organization and management of the testing can be user-defined.

Figure 1:
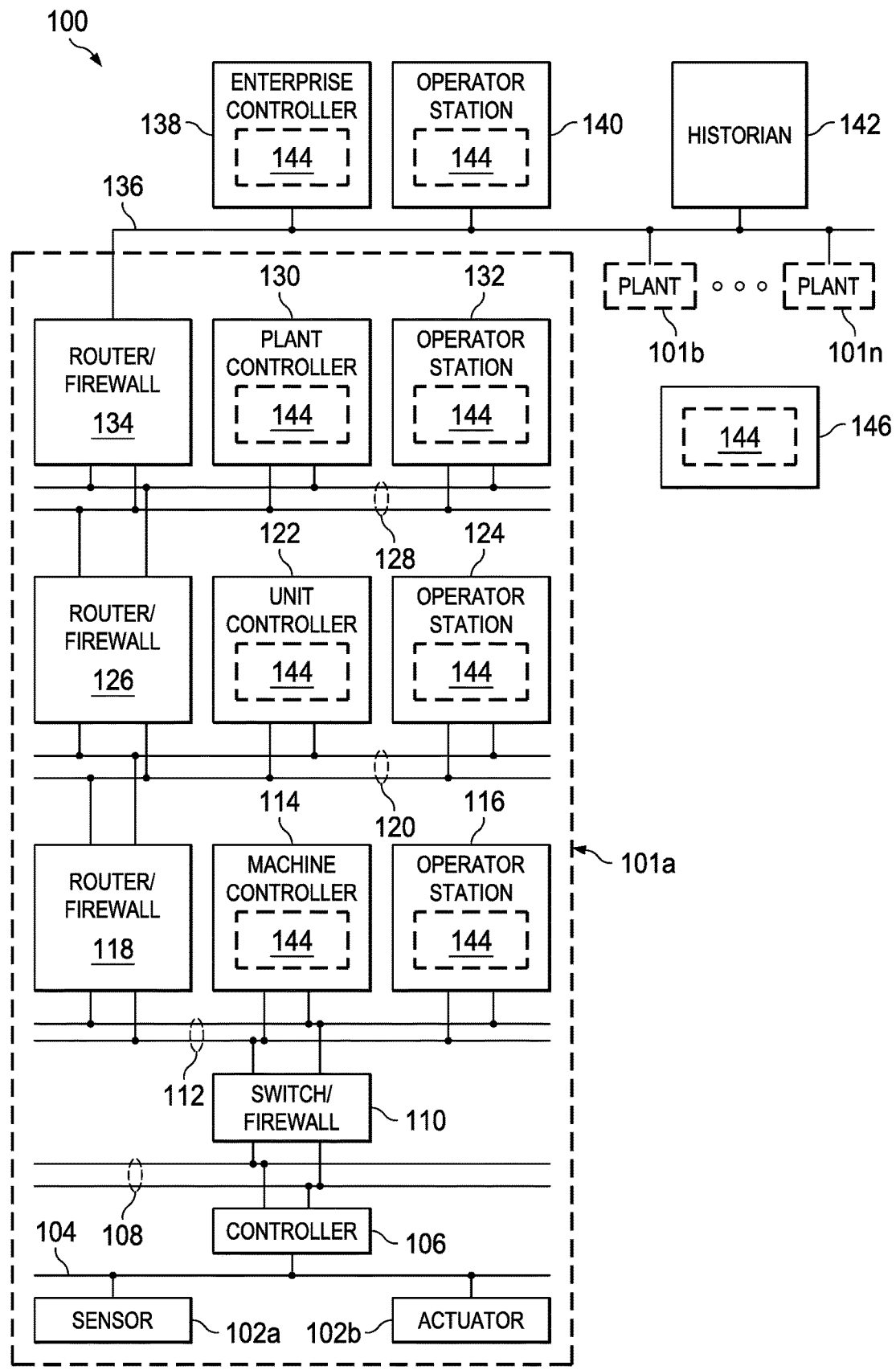
FIG. 1 illustrates an example industrial process control and automation system according to this disclosure.

FIG. 1 illustrates an example industrial process control and automation system 100 according to this disclosure. As shown in FIG. 1, the system 100 includes various components that facilitate production or processing of at least one product or other material. For instance, the system 100 is used here to facilitate control over components in one or multiple plants 101a-101n. Each plant 101a-101n represents one or more processing facilities (or one or more portions thereof), such as one or more manufacturing facilities for producing at least one product or other material. In general, each plant 101a-101n may implement one or more processes and can individually or collectively be referred to as a process system. A process system generally represents any system or portion thereof configured to process one or more products or other materials in some manner.

In FIG. 1, the system 100 is implemented using the Purdue model of process control. In the Purdue model, "Level 0" may include one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting one or more conditions in a process system.

One or more networks 104 are coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical signal network (such as a HART or FOUNDATION FIELDBUS network), a pneumatic control signal network, or any other or additional type(s) of network(s).

In the Purdue model, "Level 1" includes one or more controllers 106, which are coupled to the network 104. Among other things, each controller 106 may use the measurements from one or more sensors 102a to control the operation of one or more actuators 102b. Each controller 106 includes any suitable structure for controlling one or more aspects of a process system. As a particular example, each controller 106 could represent a computing device running a real-time operating system.

Redundant networks 108 are coupled to the controllers 106. The networks 108 facilitate interaction with the controllers 106, such as by transporting data to and from the controllers 106. The networks 108 could represent any suitable redundant networks. As particular examples, the networks 108 could represent a pair of Ethernet networks or a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as a pair of Ethernet networks or an FTE network.

In the Purdue model, "Level 2" may include one or more machine-level controllers 114 coupled to the networks 112. The machine-level controllers 114 perform various functions to support the operation and control of the controllers 106, sensors 102a, and actuators 102b, which could be associated with a particular piece of industrial equipment (such as a boiler or other machine). For example, the machine-level controllers 114 could log information collected or generated by the controllers 106, such as measurement data from the sensors 102a or control signals for the actuators 102b. The machine-level controllers 114 could also execute applications that control the operation of the controllers 106, thereby controlling the operation of the actuators 102b. In addition, the machine-level controllers 114 could provide secure access to the controllers 106. Each of the machine-level controllers 114 includes any suitable structure for providing access to, control of, or operations related to a machine or other individual piece of equipment. Each of the machine-level controllers 114 could, for example, represent a server computing device running a MICROSOFT WINDOWS operating system. Although not shown, different machine-level controllers 114 could be used to control different pieces of equipment in a process system (where each piece of equipment is associated with one or more controllers 106, sensors 102a, and actuators 102b).

One or more operator stations 116 are coupled to the networks 112. The operator stations 116 represent computing or communication devices providing user access to the machine-level controllers 114, which could then provide user access to the controllers 106 (and possibly the sensors 102a and actuators 102b). As particular examples, the operator stations 116 could allow users to review the operational history of the sensors 102a and actuators 102b using information collected by the controllers 106 and/or the machine-level controllers 114. The operator stations 116 could also allow the users to adjust the operation of the sensors 102a, actuators 102b, controllers 106, or machine-level controllers 114. In addition, the operator stations 116 could receive and display warnings, alerts, or other messages or displays generated by the controllers 106 or the machine-level controllers 114. Each of the operator stations 116 includes any suitable structure for supporting user access and control of one or more components in the system 100. Each of the operator stations 116 could, for example, represent a computing device running a MICROSOFT WINDOWS operating system.

At least one router/firewall 118 couples the networks 112 to two networks 120. The router/firewall 118 includes any suitable structure for providing communication between networks, such as a secure router or combination router/firewall. The networks 120 could represent any suitable networks, such as a pair of Ethernet networks or an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components in the lower levels. For example, the unit-level controllers 122 could log information collected or generated by the components in the lower levels, execute applications that control the components in the lower levels, and provide secure access to the components in the lower levels. Each of the unit-level controllers 122 includes any suitable structure for providing access to, control of, or operations related to one or more machines or other pieces of equipment in a process unit. Each of the unit-level controllers 122 could, for example, represent a server computing device running a MICROSOFT WINDOWS operating system. Although not shown, different unit-level controllers 122 could be used to control different units in a process system (where each unit is associated with one or more machine-level controllers 114, controllers 106, sensors 102a, and actuators 102b).

Access to the unit-level controllers 122 may be provided by one or more operator stations 124. Each of the operator stations 124 includes any suitable structure for supporting user access and control of one or more components in the system 100. Each of the operator stations 124 could, for example, represent a computing device running a MICROSOFT WINDOWS operating system.

At least one router/firewall 126 couples the networks 120 to two networks 128. The router/firewall 126 includes any suitable structure for providing communication between networks, such as a secure router or combination router/firewall. The networks 128 could represent any suitable networks, such as a pair of Ethernet networks or an FTE network.

In the Purdue model, "Level 4" may include one or more plant-level controllers 130 coupled to the networks 128. Each plant-level controller 130 is typically associated with one of the plants 101a-101n, which may include one or more process units that implement the same, similar, or different processes. The plant-level controllers 130 perform various functions to support the operation and control of components in the lower levels. As particular examples, the plant-level controller 130 could execute one or more manufacturing execution system (MES) applications, scheduling applications, or other or additional plant or process control applications. Each of the plant-level controllers 130 includes any suitable structure for providing access to, control of, or operations related to one or more process units in a process plant. Each of the plant-level controllers 130 could, for example, represent a server computing device running a MICROSOFT WINDOWS operating system.

Access to the plant-level controllers 130 may be provided by one or more operator stations 132. Each of the operator stations 132 includes any suitable structure for supporting user access and control of one or more components in the system 100. Each of the operator stations 132 could, for example, represent a computing device running a MICROSOFT WINDOWS operating system.

At least one router/firewall 134 couples the networks 128 to one or more networks 136. The router/firewall 134 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for multiple plants 101a-101n and to control various aspects of the plants 101a-101n. The enterprise-level controllers 138 can also perform various functions to support the operation and control of components in the plants 101a-101n. As particular examples, the enterprise-level controller 138 could execute one or more order processing applications, enterprise resource planning (ERP) applications, advanced planning and scheduling (APS) applications, or any other or additional enterprise control applications. Each of the enterprise-level controllers 138 includes any suitable structure for providing access to, control of, or operations related to the control of one or more plants. Each of the enterprise-level controllers 138 could, for example, represent a server computing device running a MICROSOFT WINDOWS operating system. In this document, the term "enterprise" refers to an organization having one or more plants or other processing facilities to be managed. Note that if a single plant 101a is to be managed, the functionality of the enterprise-level controller 138 could be incorporated into the plant-level controller 130.

Access to the enterprise-level controllers 138 may be provided by one or more operator stations 140. Each of the operator stations 140 includes any suitable structure for supporting user access and control of one or more components in the system 100. Each of the operator stations 140 could, for example, represent a computing device running a MICROSOFT WINDOWS operating system.

A historian 142 is also coupled to the network 136 in this example. The historian 142 could represent a component that stores various information about the system 100. The historian 142 could, for example, store information used during production scheduling and optimization. The historian 142 represents any suitable structure for storing and facilitating retrieval of information. Although shown as a single centralized component coupled to the network 136, the historian 142 could be located elsewhere in the system 100, or multiple historians could be distributed in different locations in the system 100.

To support the integration of testing functionality with industrial process control and automation functionality, the system 100 incorporates at least one instance of a testing infrastructure 144. The testing infrastructure 144 can provide a centralized portal to assist in the definition, management, and execution of tests for the control and automation system 100. The testing infrastructure 144 can also provide an ability to electronically define, store, view, and execute tests with varying attributes. The testing infrastructure 144 can further provide an ability to electronically detect functional changes in the control and automation system 100 associated with tests (such as device commissioning in which new hardware is added to the system and to modifications to existing hardware or control strategies), increasing visibility of what tests should be executed or re-executed. The testing infrastructure 144 can also provide an ability to electronically execute all tests or a subset of tests across different phases of project execution. The testing infrastructure 144 can further provide an ability to electronically organize and manage tests and track test results and test statuses, as well as an ability to electronically record test results in one or more user-defined formats. In addition, the testing infrastructure 144 can provide an ability to automatically apply functional configuration changes to ensure consistency and eliminate additional manual steps that could otherwise cause repeat tests at a later stage.

The use of the testing infrastructure 144 can provide various advantages or benefits depending on the implementation of the testing infrastructure 144. For example, the testing infrastructure 144 can provide an easy-to-use mechanism for defining and managing control and automation system tests and for reviewing test results. The testing infrastructure 144 can also support a wide range of tests. Example types of tests that can be used include automated tests (where all steps and recording of results are automated), assisted tests (where some steps and recording of results are automated and some steps that require user input/confirmation or manual entry of results are supported), and manual tests (where steps are manually performed and results are manually recorded). Any combination of automated, assisted, and manual tests could be supported in the testing infrastructure 144. The testing infrastructure 144 can further significantly reduce testing efforts by identifying those tests that do not need to be re-executed, such as by executing only those tests that are affected by functional changes to the system 100. In addition, the testing infrastructure 144 can reduce the overhead of building tests by supporting typical tests and bulk build/edit features and can reduce the number and skill level of testers.

Each instance of the testing infrastructure 144 can be implemented using any suitable hardware or combination of hardware and software/firmware. For example, in some embodiments, each instance of the testing infrastructure 144 could be implemented using one or more software programs executed by one or more processors of a device. An instance of the testing infrastructure 144 could be executed by an operator station or a controller within the system 100, or an instance of the testing infrastructure 144 could be executed by a stand-alone device (such as a server 146 or other device located at any suitable level of the system 100). Additional details regarding the testing infrastructure 144 are provided below.

Although FIG. 1 illustrates one example of an industrial process control and automation system 100, various changes may be made to FIG. 1. For example, various components in FIG. 1 could be combined, further subdivided, or omitted and additional components could be added according to particular needs. Also, industrial control and automation systems come in a wide variety of configurations. The system 100 shown in FIG. 1 is meant to illustrate one example operational environment in which integrated testing can be used. However, FIG. 1 does not limit this disclosure to any particular configuration or operational environment.

Figure 2:
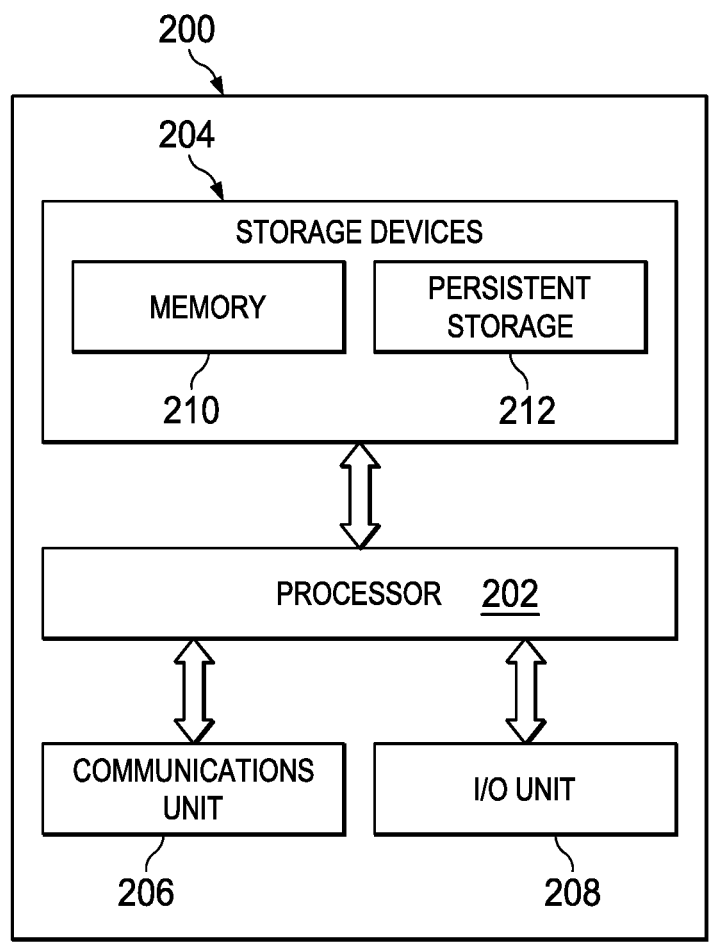
FIG. 2 illustrates an example device supporting integrated testing for an industrial process control and automation system according to this disclosure.

FIG. 2 illustrates an example device 200 supporting integrated testing for an industrial process control and automation system according to this disclosure. The device 200 could, for example, denote one of the controllers, operator stations, servers, or other components in the system 100 of FIG. 1.

As shown in FIG. 2, the device 200 includes at least one processor 202, at least one storage device 204, at least one communications unit 206, and at leas t one input/output (I/O) unit 208. Each processor 202 can execute instructions, such as those that may be loaded into a memory 210. Each processor 202 denotes any suitable processing device, such as one or more microprocessors, microcontrollers, digital signal processors, application specific integrated circuits (ASICs), field programmable gate arrays (FPGAs), or discrete circuitry.

The memory 210 and a persistent storage 212 are examples of storage devices 204, which represent any structure(s) capable of storing and facilitating retrieval of information (such as data, program code, and/or other suitable information on a temporary or permanent basis). The memory 210 may represent a random access memory or any other suitable volatile or non-volatile storage device(s). The persistent storage 212 may contain one or more components or devices supporting longer-term storage of data, such as a read only memory, hard drive, Flash memory, or optical disc.

The communications unit 206 supports communications with other systems or devices. For example, the communications unit 206 could include at least one network interface card or wireless transceiver facilitating communications over at leas t one wired or wireless network. The communications unit 206 may support communications through any suitable physical or wireless communication link(s).

The I/O unit 208 allows for input and output of data. For example, the I/O unit 208 may provide a connection for user input through a keyboard, mouse, keypad, touchscreen, or other suitable input device. The I/O unit 208 may also send output to a display, printer, or other suitable output device.

Although FIG. 2 illustrates one example of a device 200 supporting integrated testing for an industrial process control and automation system, various changes may be made to FIG. 2. For example, various components in FIG. 2 could be combined, further subdivided, or omitted and additional components could be added according to particular needs. Also, computing devices can come in a wide variety of configurations, and FIG. 2 does not limit this disclosure to any particular configuration of computing device.

FIGS. 3 through 11 illustrate an example integrated testing mechanism for industrial process control and automation systems according to this disclosure. In particular, FIGS. 3 through 11 illustrate details of an example implementation of the testing infrastructure 144. For ease of explanation, the testing infrastructure 144 is described as being implemented using the device 200 of FIG. 2 in the system 100 of FIG. 1. However, the testing infrastructure 144 could be implemented using any suitable device and in any suitable system.

Figure 3:
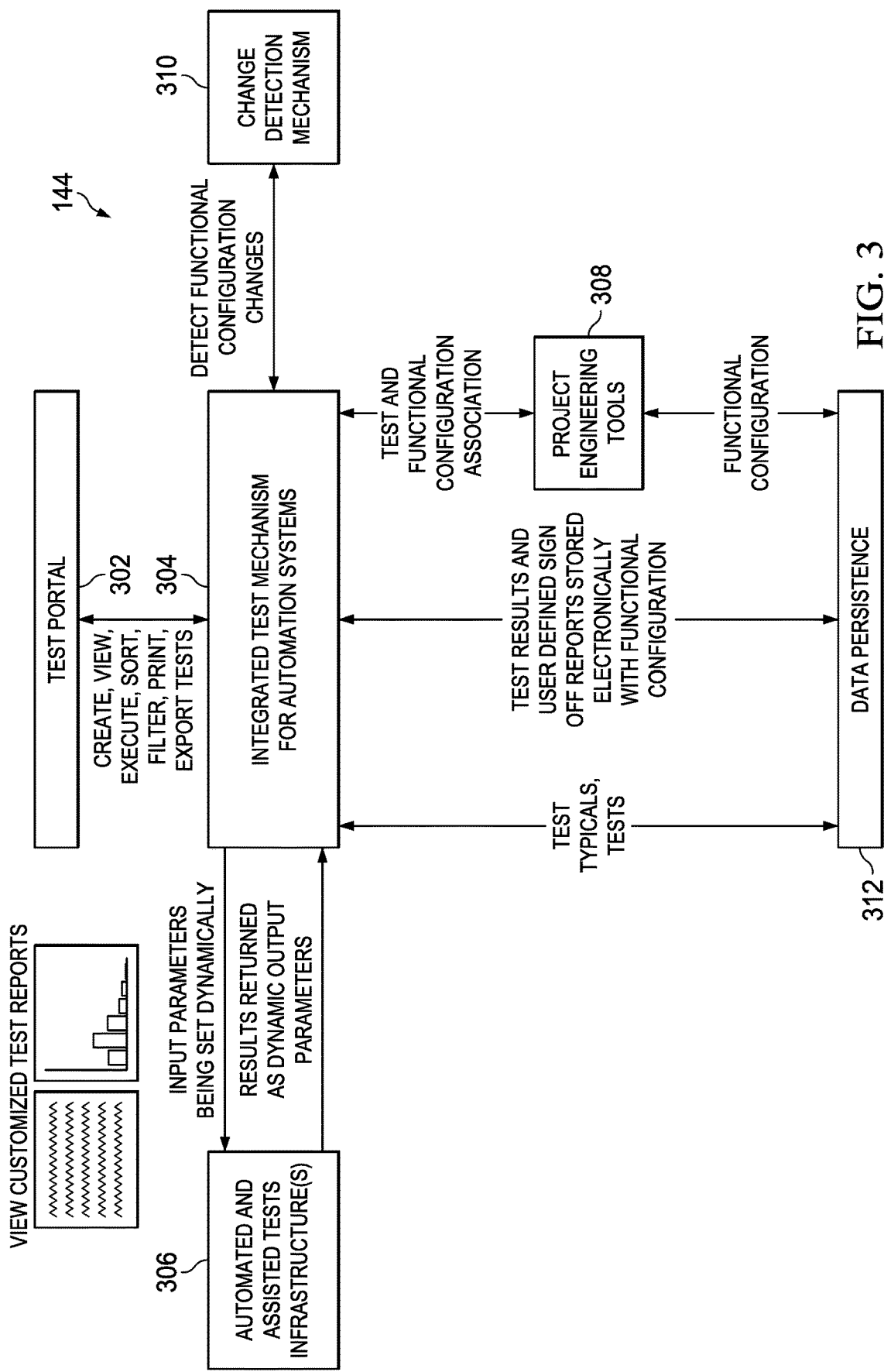
FIGS. 3 through 11 illustrate an example integrated testing mechanism for industrial process control and automation systems according to this disclosure.

FIG. 3 illustrates an example architecture for the integrated testing infrastructure 144. The testing infrastructure 144 interacts with one or more components of a given control and automation system (such as the system 100) to provide integrated support for testing of the control and automation system. As shown in FIG. 3, the testing infrastructure 144 includes a test portal 302, which supports graphical user interfaces related to the testing of a control and automation system. The graphical user interfaces could support functions such as allowing users to create, view, execute, sort, filter, print, and export tests. The graphical user interfaces could also support functions such as allowing users to view and print various customized test reports, which can be used to determine an overall test completion status of various automation projects. The test portal 302 includes any suitable logic supporting one or more graphical user interfaces.

The testing infrastructure 144 also includes an integrated test mechanism for automation systems (ITMAS) 304, which provides an infrastructure for automated testing and serves as an orchestrator for various activities. The activities can include test and test typical creation and association with functional objects of a control and automation system. As described below, functional objects of a control and automation system generally denote objects implementing some aspect of control or automation functionality in the system. Thus, the association of tests with functional objects allows users to identify tests for specific functional aspects of a control and automation system. The activities can also include interaction with various test infrastructures that perform actual test execution. The activities can further include interaction with change detection functionality to detect any changes made to the functional objects of a control and automation system and flagging of tests that need to be re-executed based on detected changes to the functional objects referenced in those tests. In addition, the activities can include test management activities, such as the filtering and sorting of tests. The ITMAS 304 includes any suitable logic supporting integrated testing within a control and automation system. Details of example implementations of the ITMAS 304 are provided below.

The testing infrastructure 144 further includes one or more test infrastructures 306, which denote any suitable infrastructure(s) that can be plugged in or otherwise associated with the ITMAS 304 and that perform actual tests involving a control and automation system. The test infrastructure 306 may contain or support various automated tests that are defined to verify whether devices, systems, or other hardware is configured or functioning as expected. The test infrastructure 306 may also contain or support various manual or assisted tests that are performed with some form of manual intervention or input. The test infrastructure 306 can further support any suitable test report formats, such as user-defined formats. The ITMAS 304 can interact with the test infrastructure 306, such as through clearly-defined data and service contracts, to execute the tests. The contracts can be used to define input parameters (such as those that are set dynamically for hardware selected for testing) and output parameters (such as what outputs will be returned to the ITMAS 304). The outputs can be converted to test results by the ITMAS 304 and displayed to a user. Each test infrastructure 306 includes any suitable logic that performs tests involving a control and automation system.

One or more project engineering tools (also referred to as builder tools) 308 denote tools used in a control and automation system to build functional configurations. The functional configurations can include functional configuration objects that define, for example, control operations performed by controllers or other devices in the control and automation system. The project engineering tools 308 can also be used to build tests for testing associated functional configurations and functional configuration objects. Each project engineering tool 308 denotes any suitable logic for defining configurations of a control and automation system or tests thereof.

At least one change detection module 310 monitors and detects any changes to functional configurations of a control and automation system. The changes to the functional configurations could be caused by users using the project engineering tools 308 or in any other suitable manner. On user request or at other times, the ITMAS 304 can request the states of functional configuration objects referenced in various tests from the change detection module 310. The ITMAS 304 can record the states for these objects and, later when there is a need to re-verify the validity of tests performed earlier, the ITMAS 304 can again request the states of the objects to determine whether changes have been made to the functional configuration objects. If the states of certain objects are unchanged, the ITMAS 304 can determine that prior test results involving those objects remain valid. Otherwise, if the states of certain objects have changed, the ITMAS 304 can determine that prior test results involving those objects are no longer valid, and various tests involving those objects should be re-executed. Each change detection module 310 includes any suitable logic for identifying changes to objects.

At least one data storage 312 can be used for data persistence related to the testing infrastructure 144 or the control and automation system 100. For example, a data storage 312 could be used to store functional configuration objects and tests associated with the functional configuration objects. Thus, functional configurations, instructions used to test the functional configurations, and results of the tests can be co-located in the same data storage 312. However, different devices could also be used to store different data. Each data storage 312 includes any suitable storage and retrieval device(s).

Figure 4:
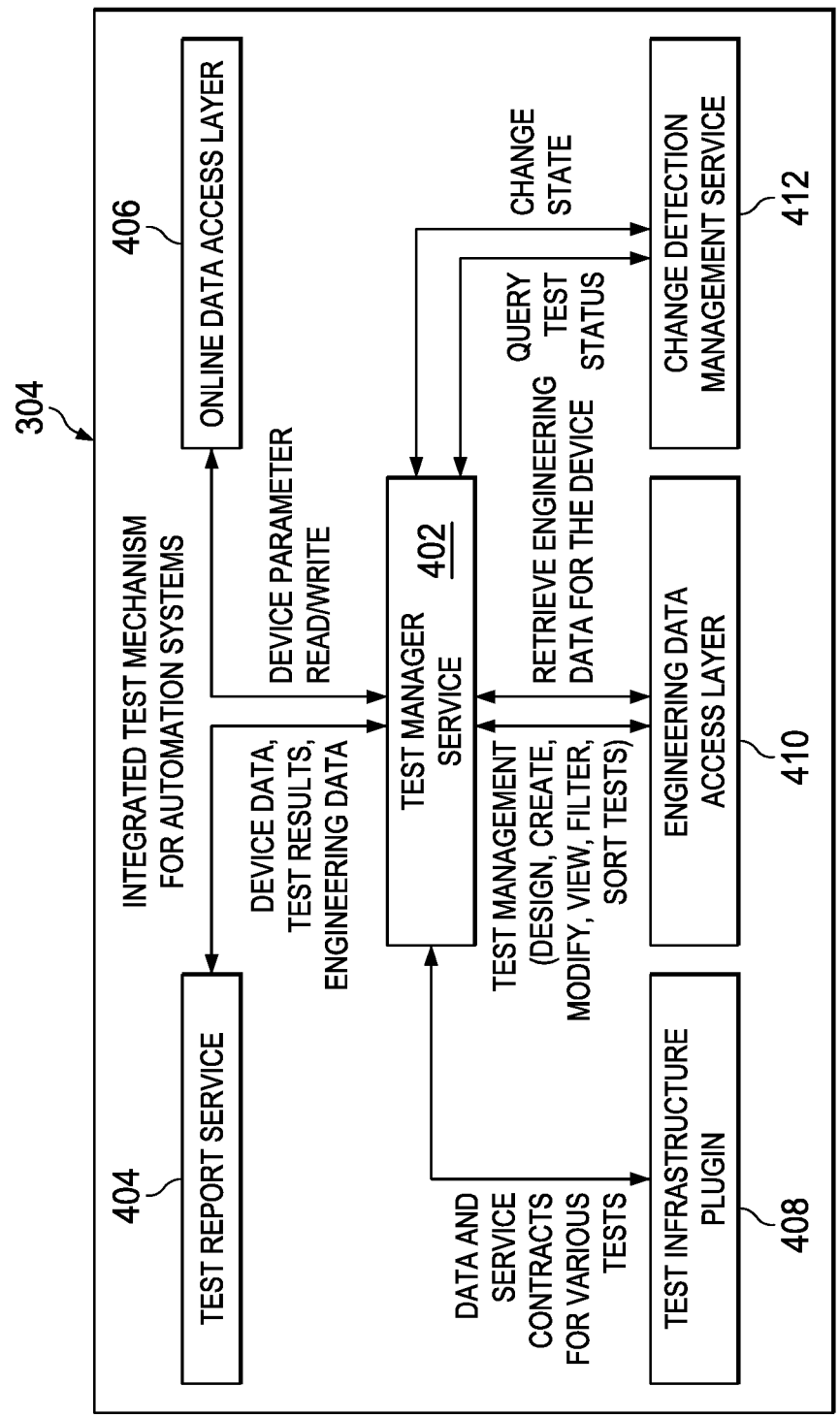

FIG. 4 illustrates an example architecture for the ITMAS 304 of FIG. 3. As shown in FIG. 4, the ITMAS 304 includes a test manager service 402, which can be used to support the creation, management, and execution of various tests involving a control and automation system. The test manager service 402 interacts with various other components to support these functions. For example, a test report service 404 can receive device data, engineering data, and test results from the test manager service 402 and generate reports for users. An online data access layer 406 can be used to read data from or write data to devices of a control and automation system, such as data related to different parameters of the devices. The data can be used by the test manager service 402 to support testing of the devices or the overall system containing the devices. A test infrastructure plugin service 408 can use data and service contracts from the test manager service 402 to control interactions with one or more test infrastructures 306. An engineering data access layer 410 supports interactions with project engineering tools 308, such as to support the exchange of data involving the design, creation, modification, viewing, filtering, and sorting of tests and to support the retrieval of engineering data for devices. A change detection management service 412 supports interactions with the change detection modules 310 in order to identify changes to functional configuration objects and tests to be re-executed in view of the changes. Each of the components 402-412 in FIG. 4 could be implemented in any suitable manner. For example, each of the components 402-412 could be implemented in software and executed by one or more processors 202.

Using these components, the ITMAS 304 is able to receive and use user input in order to build and store functional configurations and tests related to the functional configurations. The functional configurations and tests can be stored along with control and automation system data. There is no need for separate paper documentation. Sorting and filtering of tests can be supported (such as based on test attributes), along with an ability to create customized test reports. Tests could also be created in bulk from test templates. As needed or desired, manual, assisted, and automated testing can be performed in any suitable combination based on project needs, and results of the tests can be automatically or manually recorded. The ability to track changes to functional configuration objects allows identification of tests to be re-executed while avoiding the overhead associated with locking mechanisms and while avoiding the unnecessary re-execution of tests. As particular examples, "baseline" testing can occur initially (without reference to whether changes have occurred), and subsequent testing may only occur based on whether changes justify retesting or new testing. Also, the commissioning of new hardware can include commissioning or "audit" tests to detect changes to a control and automation system associated with the new hardware.

In particular embodiments, templates for creating tests can be based on MICROSOFT EXCEL spreadsheets, where the templates describe manual, assisted, or automated tests. The spreadsheets can be used by users to manually create new tests based on existing templates, and multiple tests can be "bulk" built using a builder program and the spreadsheets. Additional spreadsheets can be created to provide and update test completion statuses, test results, and associated details.

Figure 5:
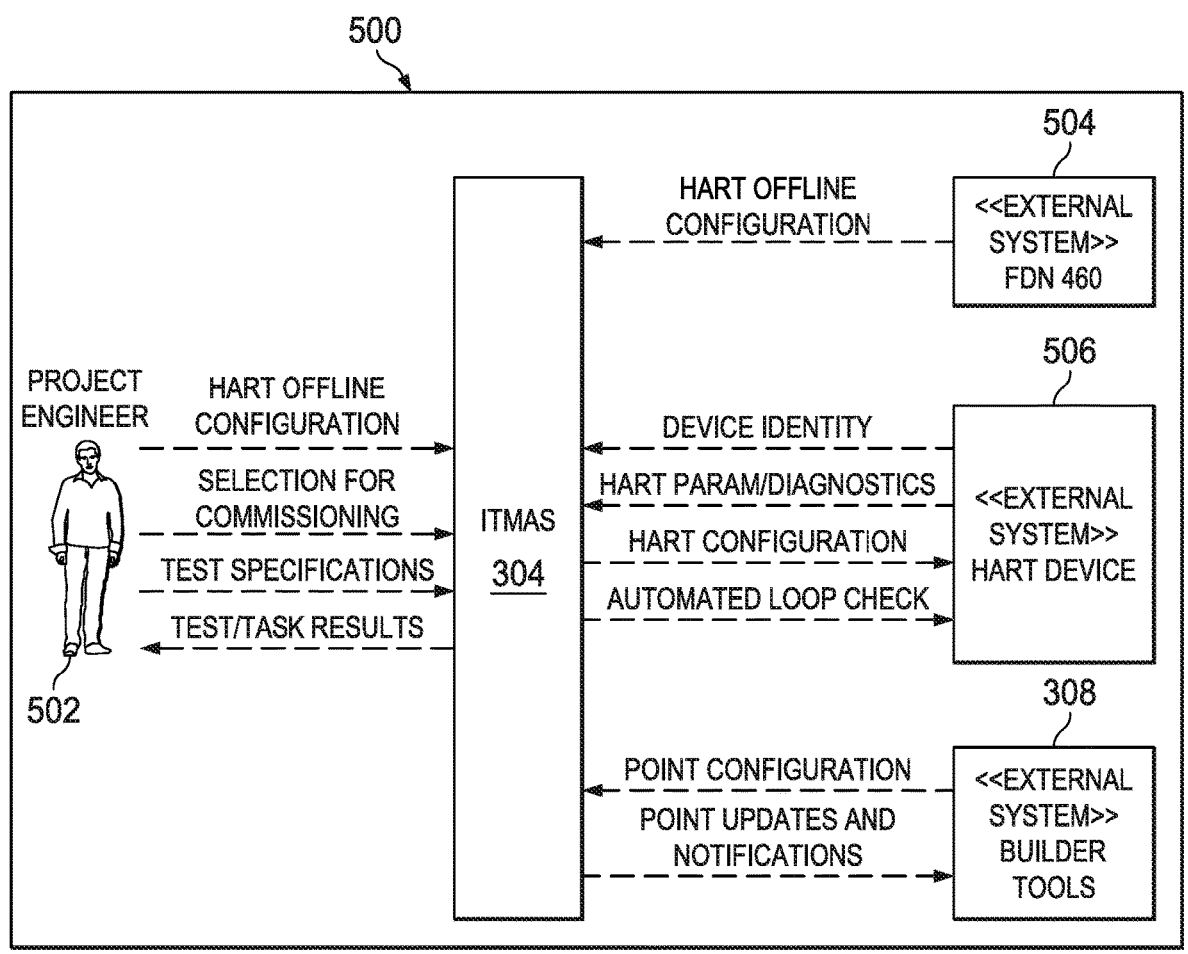

FIG. 5 illustrates an example context model 500 associated with the ITMAS 304. As shown in FIG. 5, the context model 500 identifies a project engineer or other personnel 502, who interact with the ITMAS 304 through one or more suitable interfaces. The personnel 502 can provide various data to and receive various data from the ITMAS 304. For example, the personnel 502 could provide configuration data for Highway Addressable Remote Transducer (HART) devices or other devices to the ITMAS 304. The personnel 502 could also provide a selection of a specific device or devices for commissioning and test specifications defining one or more tests to be performed. The personnel 502 could further receive data such as test results from the ITMAS 304.

The ITMAS 304 here also interacts with various external devices or systems. For example, the ITMAS 304 could interact with a device manager 504, such as a FIELD DEVICE MANAGER or "FDM" from HONEYWELL INTERNATIONAL INC. The device manager 504 could be used to provide configuration data to HART devices or other devices and to provide confirmation information to the ITMAS 304. The ITMAS 304 could also interact with field devices 506, such as HARD devices or devices supporting other protocols. The ITMAS 304 could provide configuration data or automated loop check data to the field devices 506 and receive device identifiers and device parameter or diagnostic data from the field devices 506. In addition, the ITMAS 304 could interact with project engineering tools 308, such as by receiving point configurations and providing updates.

Figure 6:
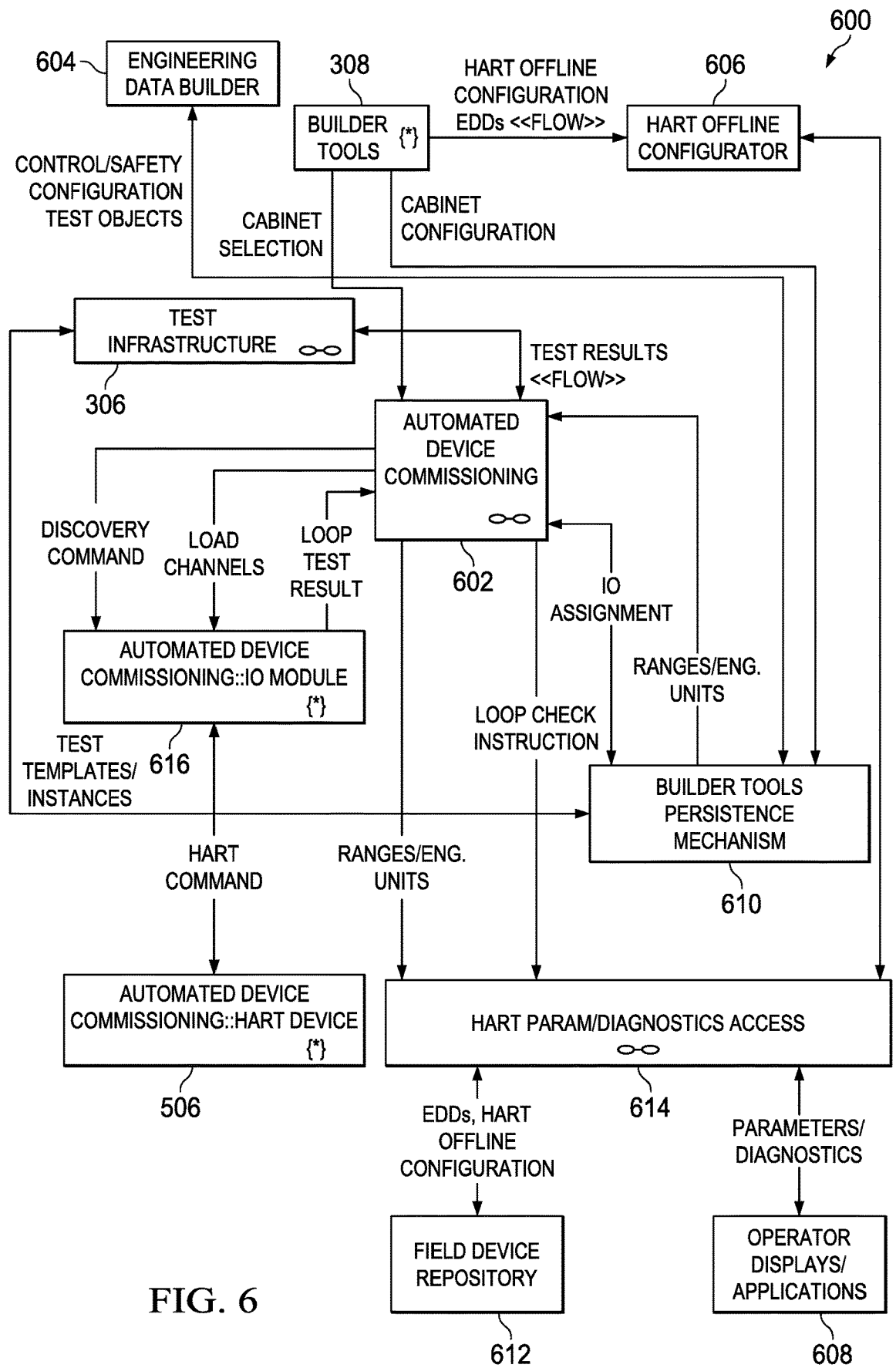

FIG. 6 illustrates an example concept model 600 associated with the testing infrastructure 144. As shown in FIG. 6, the concept model 600 includes an automated device commissioning module 602, which supports automated device commissioning. The project engineering tools 308 can be used here to, for example, build HART points in an EXPERION server from HONEYWELL INTERNATIONAL INC.

An engineering data builder 604 supports bulk build/edit input/output (I/O) and strategies in a bi-directional manner with configuration repositories. For example, the engineering data builder 604 could support the bulk building of test templates and instances. An offline configurator 606 supports the building of configuration templates. For instance, the offline configurator 606 can provide templates for use by other components, such as the engineering data builder 604. However, the functionality of the offline configurator 606 could be incorporated into another builder tool. One or more operator displays/applications 608 denote one or more user interfaces that allow operators to monitor processes and respond to alarms and events as needed.

A persistence mechanism 610 denotes a repository for persisting builder tool-specific configuration data. The persistence mechanism 610 can also be used to store test templates and test instances. A field device repository 612 denotes a repository containing device electronic device description (EDD) files, offline templates, or other device-related data, which can be used for automated device configuration.

A parameter/diagnostic access module 614 supports access to device parameters and diagnostics information of the field devices 506, such as via tag names. An I/O module 616 supports interactions with the field devices 506, such as the transmission of commands to the field devices 506. An I/O module 616 could be local to or remote from the testing infrastructure 144 and can include terminals and processing power to accept input signals (such as from transmitters or thermocouples) and send output signals (such as to valves or motors).

Figure 7:
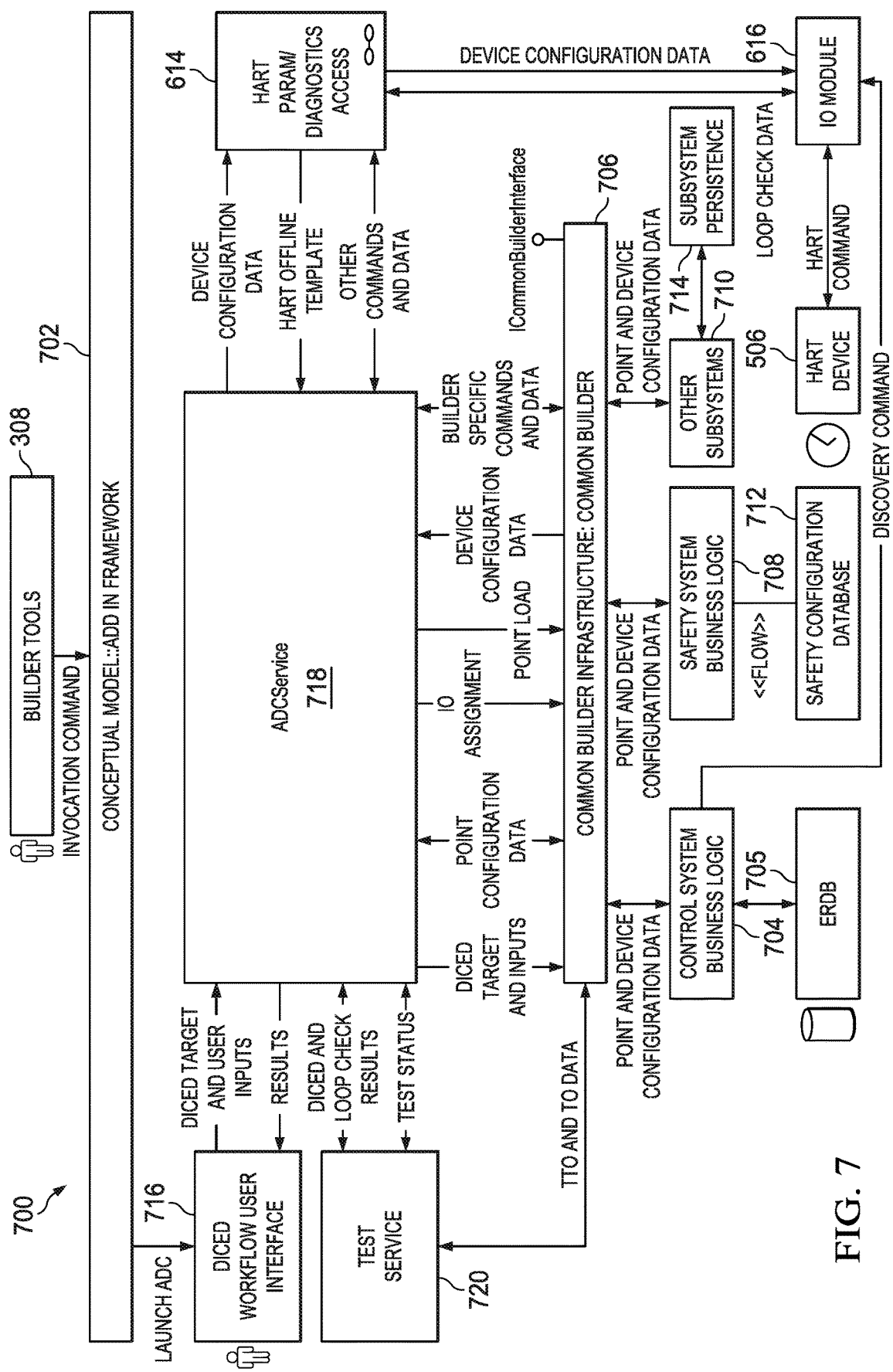

FIG. 7 illustrates an example concept model 700 associated with automated device commissioning (ADC) functionality of the testing infrastructure 144. Automated device commissioning functionality (also be referred to as "DICED" functionality) can be used to automatically commission new hardware in a control and automation system, which can also trigger the identification of tests to be performed due to the changes to the control and automation system.

As shown in FIG. 7, the concept model 700 includes an add-in framework 702, which allows different add-ins to be added in order to support the use of different project engineering tools 308. Control system business logic 704 contains logic corresponding to the control and automation system, such as logic for managing control strategies and for reading and writing parameters based on rules that apply to process control. An engineering repository database (ERDB) 705 can be used to store data related to the control strategies and parameters. A common builder 706 includes one or more interfaces used by the project engineering tools 308 to execute functions related to control and automation system tests. Each tool 308 can provide an implementation of these interfaces to interact with application programming interfaces (APIs) of business logic 704.

Safety system business logic 708 contains logic related to a safety subsystem, such as logic for managing safety point configurations and for reading and writing parameters based on rules that apply to process safety. Other subsystems 710 could denote subsystems that can initiate automated device commissioning using the illustrated architecture, such as wireless subsystems or remote terminal/telemetry unit (RTU) devices. A safety configuration database 712 denotes a repository for persisting safety-specific configuration data, and a subsystem persistence 714 denotes a repository for other subsystem-related data.

A workflow user interface 716 denotes a dynamic link library or other functionality that guides users through automated device commissioning operations and that presents status messages and error messages. For example, the user interface 716 could present a user with the scope and status of a commissioning activity, visualize the overall status, and prompt the user for inputs when necessary. The user interface 716 may also be used to retrieve and present test reports. An ADC service 718 denotes a dynamic link library or other functionality utilized by the user interface 716 and representing the underlying logic for ADC operations. For instance, the ADC service 718 can support communications with I/O modules 616 for device discovery and channel configuration. The ADC service 718 can also interact with the parameter/diagnostic access module 614 for providing configuration data and reading parameter values and can initiate tests via a test infrastructure 306.

A common builder infrastructure (of which the common builder 706 is a part) denotes a dynamic link library or other functionality utilized to facilitate interactions with the user interface 716 and provide automated device commissioning to the business logic 704 (such as database access and runtime access). The common builder infrastructure provides interface definitions that can be common to all project engineering tools 308. The project engineering tools 308 can provide specific underlying implementations of the interfaces to the common builder infrastructure.

A test service 720 denotes a common infrastructure (such as a user interface and engine) for providing common test capabilities to the various project engineering tools 308. The test service 720 interacts with the ADC service 718 to receive invocations of tests and to provide test statuses and test results.

Figure 8:
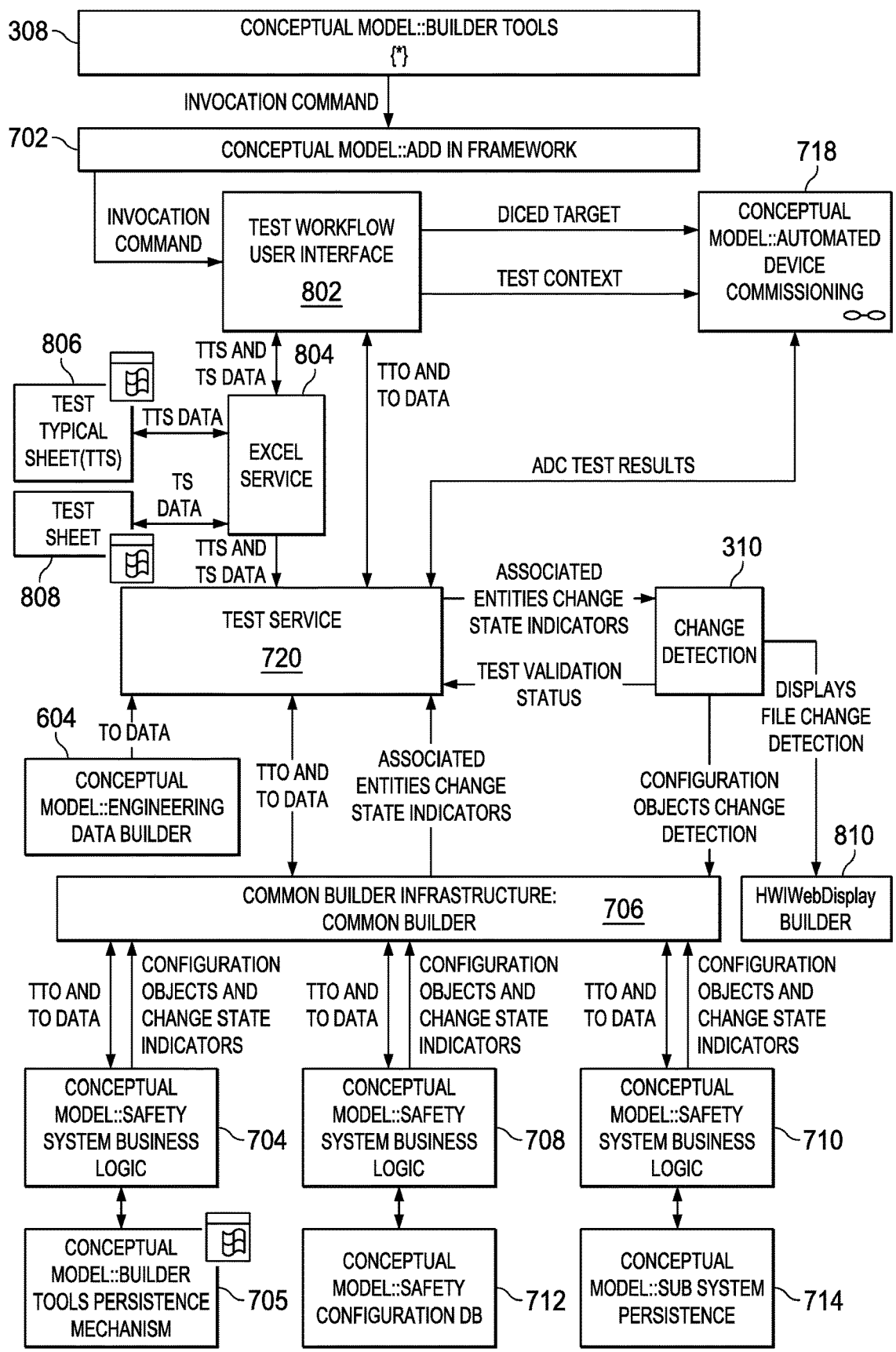

FIG. 8 illustrates an example test architecture 800 that can be supported within the testing infrastructure 144. As shown in FIG. 8, the test architecture 800 includes two primary components, namely a test workflow user interface 802 and the test service 720. The user interface 802 allows users to perform test-related functions, while the test service 720 is responsible for providing test-related business logic and for providing access to/from EXCEL spreadsheets or other content.

In FIG. 8, the change detection module 310 detects any changes to configuration objects and displays the changed objects that are associated with control and automation system tests. An EXCEL service 804 is used by the testing infrastructure 144 to manage test results, such as test results associated with automated device commissioning and loop check tests. The service 804 can be provided or managed by the add-in framework 702 in order to interact with MICROSOFT EXCEL. The test service 720 is responsible for managing test-related data, which in this example is persisted in EXCEL spreadsheets as well as in a configuration and test database. Clients of the test service 720 could use an API to get or set data for a given test or set of tests.

A test typical sheet (TTS) 806 denotes a template for forming actual instances of tests. A TTS 806 can represent an EXCEL spreadsheet that is designed to present test instructions and include a place to record test results manually or automatically. A TTS 806 can be included as a parameter of a test typical object during a test typical creation and persisted as a "blob" in a database. Additional information (such as the associated entity types) can be defined in the TTS 806 in order to control and validate what types of objects need to be bound during an actual test instantiation.

A test sheet (TS) 808 defines an actual instance of a test and is created based on a TTS 806. A TS 808 can represent an EXCEL spreadsheet that is instantiated from a TTS 806. A TS 808 denotes the spreadsheet that a user can open and edit to store results of manual tests and/or the spreadsheet that is automatically updated in cases of automated or assisted tests. In some embodiments, a TS 808 can be created as a copy of a TTS 806, updated with the actual associated entities, and added as a parameter of a test object to be persisted as a "blob" in a database.

A human machine interface (HMI) builder 810 can be used to create graphical displays, such as displays identifying detected changes to functional configuration objects and displays on which field device parameters are referenced. The HMI builder 810 includes any suitable logic for creating graphical displays.

Figure 9:
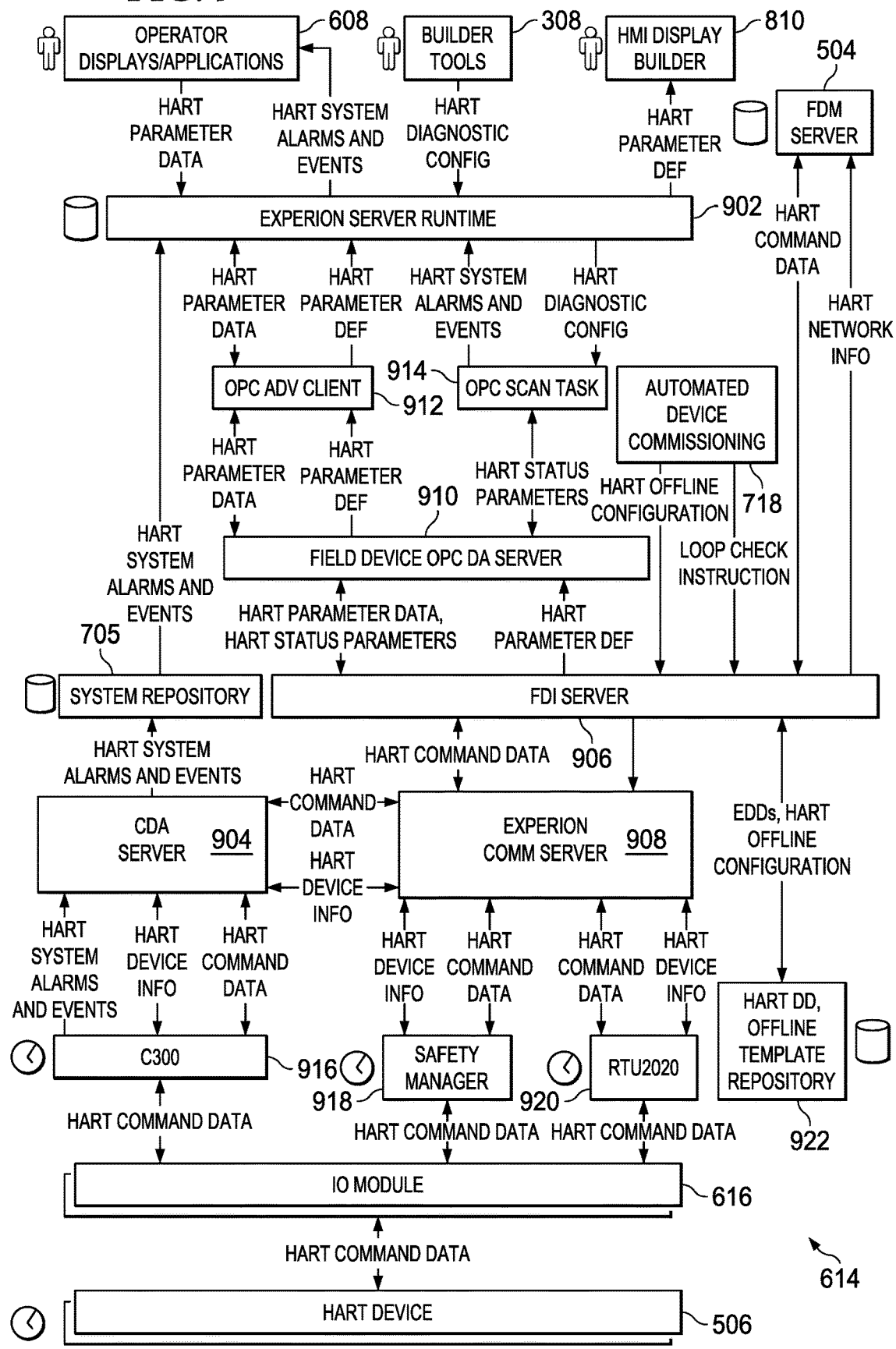

FIG. 9 illustrates an example implementation of the parameter/diagnostic access module 614 of FIG. 6. In this example, the access module 614 can support native HART parameter access and HART diagnostic reporting in an EXPERION system. As shown in FIG. 9, an EXPERION server's runtime subsystem 902 can hold details of points in the system and can be the primary source for data access through operator displays and for custom applications. The subsystem 902 can be used to route parameter access either to a control data access (CDA) server 904 or to a field device integration (FDI) server 906. Parameters could be built as CDA parameters and fetched through the CDA server 904. For other parameters not built as CDA parameters, the subsystem 902 can route parameter access to the FDI server 906.

An EXPERION communication server 908 abstracts actual communications with field devices 506 connected to various controllers or gateways. For example, different controllers or gateways could support different communication mechanisms like CDA, HART-IP, or FAP (FDM Application Protocols). The communication server 908 knows the supported communication protocols and can handle communication specifics while dealing with HART or other commands. For instance, the communication server 908 can work with the FDI server 906 to facilitate HART communications. In some embodiments, the communication server 908 can be based on the Remote Communication Interface (RCI) of the HONEYWELL FDM.

A field device OPC data access (DA) server 910 denotes a layer on top of the FDI server 906 that provides access to HART parameter definitions and HART parameter values for the field devices 506. The DA server 910 can offer server address space browsing features and could be implemented using a private OPC server. One function of the DA server 910 can be to offer read-only parameter access to the subsystem 902 and its clients (like the operator displays/applications 608). The DA server 910 can rely on the underlying FDI server 906 for information about the field devices 506 and their parameters.

Two clients of the runtime subsystem 902 are an OPC advanced client 912 and an OPC SCAN task 914. The OPC advanced client 912 can be used to fetch HART parameter definitions and HART parameter values, while the OPC SCAN task 914 can be used to fetch HART status parameters. A C300 server 916 denotes an industrial process controller and can integrate with an EXPERION server through CDA. A safety manager 918, such as the EXPERION SAFETY MANAGER, could integrate with an EXPERION server through EXPERION Communication Infrastructure (ECI). An EXPERION RTU2020 module 920 could integrate with an EXPERION server through SCADA. A repository 922 is used to store device description (DD) files, offline templates, or other data associated with the field devices 506.

Figure 10:
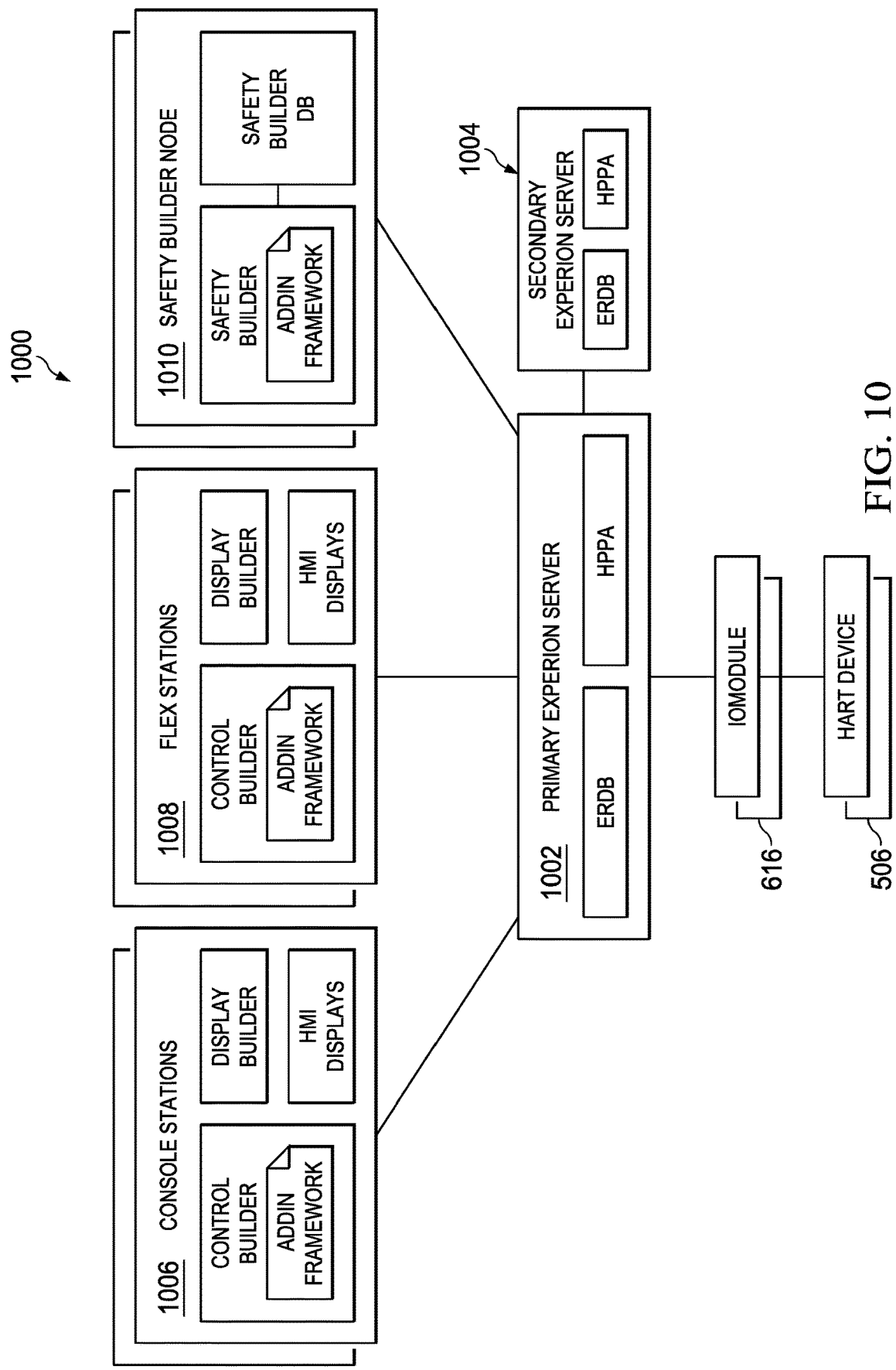

FIG. 10 illustrates an example deployment view 1000 of the testing infrastructure 144 in an industrial process control and automation system. The way in which components are distributed across hardware and software platforms can have a large bearing on the manageability, robustness, and security of the overall system. The deployment view 1000 provides one example way in which system components map to hardware and software platforms and the network topology connecting everything together.

As shown in FIG. 10, primary and secondary servers 1002-1004 are used to control the field devices 506 via the I/O modules 616. In a redundant server setup, infrastructure components (such as the DA server 910, FDI server 906, and communication server 908 and associated network drivers) can be installed on both servers 1002-1004 but only active on the primary server (server 1002 in this example). Each server 1002-1004 can include an ERDB or other structure for persistence of control and automation data and an HPPA or other structure for persistence of parameter and diagnostic data.

The primary server 1002 interacts with control stations 1006, flex stations 1008, and safety builder nodes 1010. Each of the control stations 1006 and flex stations 1008 could support an application for creating process control functions, an application for creating HMI displays, and a display for presenting the HMI displays. Each of the safety builder nodes 1010 could support an application for creating safety-related functions and a database for persistence of safety-related information.

Figure 11:
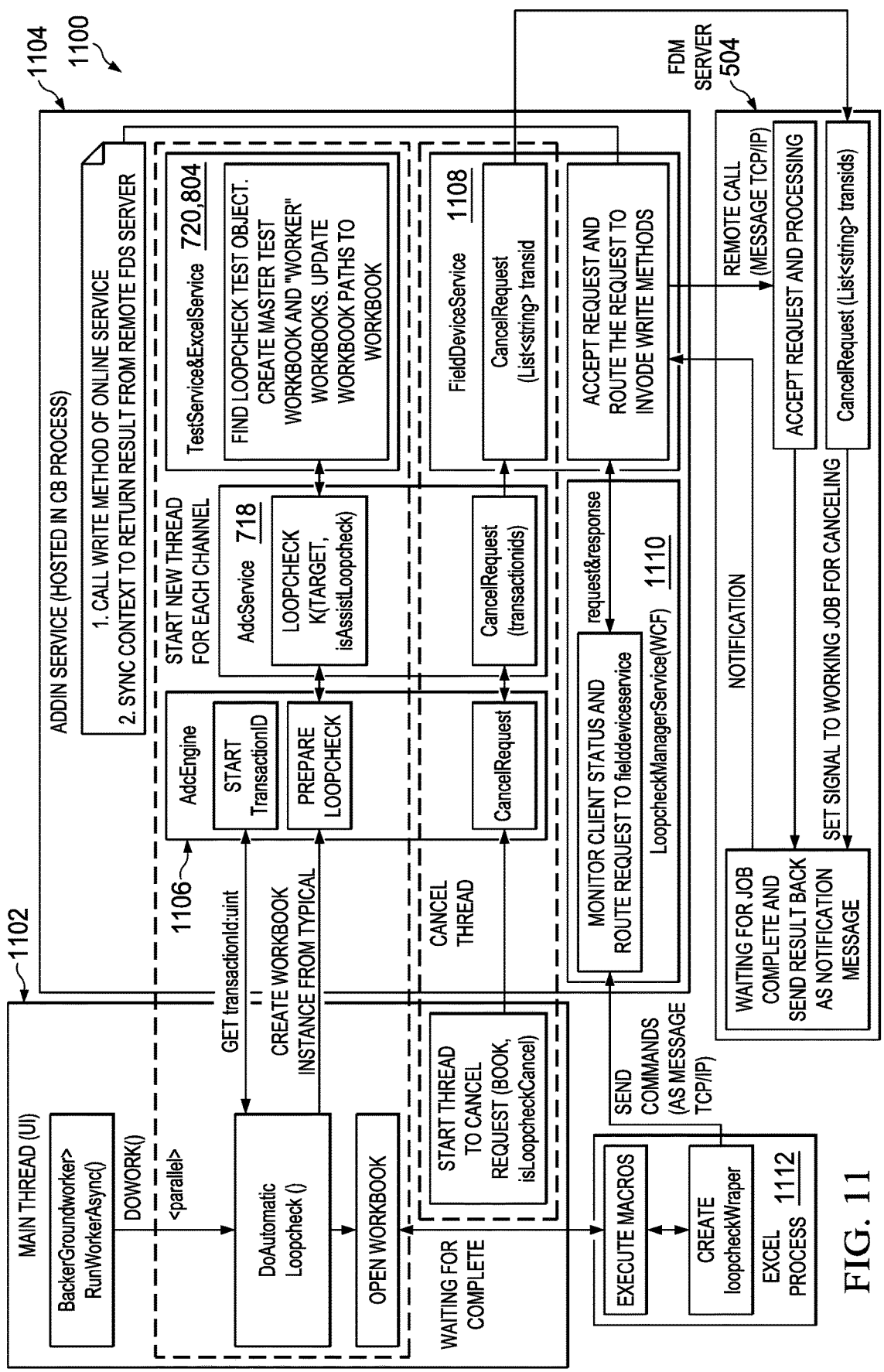

FIG. 11 illustrates an example threaded model 1100 associated with the testing infrastructure 144. As shown in FIG. 11, the threaded model 1100 includes a main thread 1102 executed by the user interface 802 and an add-in service 1104 executed as part of the test service 720. For each channel (device or object) associated with a test, the main thread 1102 creates a new thread in which the main thread 1102 interacts with an ADC engine 1106, which can assign a transaction identifier and prepares a loop check test or other test. The ADC engine 1106 also interacts with the ADC service 718, which initiates the loop check or other test. The ADC service 718 interacts with the test service 720 and the EXCEL service 804 to locate the appropriate objects and create a suitable workbook. The main thread 1102 can open the workbook for the test in order to obtain and use the results of the test, such as by presenting the results of the test to a user.

Once the testing is completed for each thread, the main thread 1102 cancels that thread via the ADC engine 1106, the ADC service 718, and a field device service 1108. The field device service 1108 interacts with the device manager 504 to obtain results of the test, which are provided via a manager service 1110. The manager service 1110 interacts with an EXCEL process 1112, which creates a wrapper and executes macros to store test result data in the appropriate workbook.

The following provides example use cases of how the testing infrastructure 144 described above can be used to support various functions. These functions are for illustration only, and any number of other or additional functions could be supported by the testing infrastructure 144 as needed or desired. Each function described below could be initiated in any suitable manner, such as by using the appropriate project engineering tool 308. For example, in response to invocation of an automated device commissioning function, the ADC service 718 can retrieve a current configuration for a target device from the ERDB 705, and current data for the target device can be reflected in the user interface 716.

In response to invocation of a device discovery function, the ADC service 718 can send (via the business logic 704 or the parameter/diagnostic access module 614) discovery commands to I/O modules 616, which send discovery and interrogation commands to field devices 506. The results are received and presented in the user interface 716 and can be persisted in a test involving the field devices 506.

In response to invocation of an assign and load channel function, the ADC service 718 can update channel assignments in the ERDB 705, and the ADC service 718 (via the business logic 704) can load a channel to an appropriate I/O module 616. Results are received by the ADC service 718 via the parameter/diagnostic access module 614 and presented in the user interface 716 and can be persisted in a test involving the field devices 506.

In response to invocation of a device configuration function, the ADC service 718 can read ranges and engineering units of a device from the ERDB 705, and the ADC service 718 (via the parameter/diagnostic access module 614) can send the values to a field device 506. The results are received by the ADC service 718 via the parameter/diagnostic access module 614 and presented in the user interface 716 and can be persisted in a test involving the field devices 506.

In response to invocation of a loop test execution function, the ADC service 718 can send loop check instructions to a field device 506 (via the parameter/diagnostic access module 614 or a CBI interface). The results are received by the test service 720 via the parameter/diagnostic access module 614 and presented in the user interface 802 and can be persisted in a test involving the field device 506.

In response to invocation of a test build function, a user creates a TTS 806, such as according to a TTS rule, and the user invokes the user interface 802. The user can then create or add a new TS 808 based on the TTS 806, and the test service 720 works with the common builder 706 to save the new template in a suitable storage.

In response to invocation of a bulk test build function, a user can set up test-related data (such as names of entities to associate with tests) using the engineering data builder 604. A user triggers a build operation to create the desired test objects. As part of creating a test object, the test service 720 can make a copy of a TTS 806, customize each copy of the TTS 806 for binding to selected associated entities, and save each copy of the TTS 806 as a blob of a test object parameter. This is where manual, assisted, and automated test results will ultimately be persisted.

In response to invocation of a manual test creation function, a user can invoke the test workflow user interface 802. The user interface 802 can obtain a list of templates and tests for presentation to the user, and the user can create a new test by selecting a TS 808 and providing names for associated entities. The test service 720 works with the common builder 706 to save the newly-instantiated test object.

In response to invocation of a manual test execution, a user selects a test to perform using the workflow user interface 802. The associated TS 808 is opened for the user to perform the test's sub-activities and to record the results. The user closes the TS 808 and updates the test's status when finished. The test service 720 works with the common builder 706 to persist the test results and status.

In response to invocation of an assisted or automated test execution, a user chooses to invoke the workflow user interface 802 in order to select the test to perform. A list of tests is presented to the user for selection. Once a specific test is selected, the user interface 716 can be invoked or navigated to with the test context automatically provided. As operation progresses, results for the test are recorded and passed to the test service 720 for persistency. If necessary, user input can be requested at the appropriate time(s) during an assisted test.

In response to invocation of a field device parameter display function of an operator display/application 608, a user can open a custom display with field device parameters using the operator display/application 608. A request for one or more field device parameters flows through the runtime subsystem 902 to the FDI server 906. The FDI server 906 can respond to the request using data from its data cache or by fetching the required DD information from the repository 922 and sending field device commands to the communication server 908. The communication server 908 scatters the field device commands to the appropriate controllers using one or more appropriate communication protocols. Based on the request type (such as request/response or publish/subscribe), the FDI server 906 provides the requested data to the runtime subsystem 902 in an appropriate manner.

In response to invocation of a field device parameter display function of an HMI builder 810, a user can create a custom display in the HMI builder 810 and open a parameter selector on a specific field device point (such as one connected via a safety manager 918). The runtime subsystem 902 responds with a list of parameters if cached or makes a request to the FDI server 906 if not. The FDI server 906 may respond either by using data from its cache or by using information from the repository 922 to fetch the parameter definitions. The FDI server 906 then responds to the runtime subsystem 902, and the runtime subsystem 902 further responds to the HMI builder 810.

In response to invocation of a safety manager diagnostic access function, a user can configure field device diagnostic bits as alarms or events and download them to the runtime subsystem 902. The runtime subsystem 902 pushes the diagnostics information to the OPC SCAN task 914, which subscribes the diagnostic parameters with the FDI server 906. The FDI server 906 publishes the information either by using its data cache or by using field device commands to fetch parameter values via the communication server 908. The communication server 908 fetches the parameter values from the safety manager 918, and the communication server 908 responds to the FDI server 906 with the parameter values. The FDI server 906 publishes any changes to the parameter values to the OPC SCAN task 914, and the OPC SCAN task 914 interprets the parameter value changes against the diagnostics configuration and further raises system alarms/events as appropriate.

In response to invocation of a device configuration function for automated device commissioning, a user chooses an option in the user interface 716 to download pre-configured offline parameter information on a selected field device. The user interface 716 sends the configured parameter information to the FDI server 906 through an appropriate mechanism (such as a specific template). The FDI server 906 processes the offline configuration information and uses the corresponding information in the repository 922 to download the information through appropriate field device commands. The field device commands are sent to the communication server 908, which sends the commands to the appropriate field device(s) 506. The FDI server 906 responds back to the user interface 716 with an appropriate status of the download operation.

Although FIGS. 3 through 11 illustrate one example of an integrated testing mechanism for industrial process control and automation systems, various changes may be made to FIGS. 3 through 11. For example, various components in FIGS. 3 through 11 could be combined, further subdivided, or omitted and additional components could be added according to particular needs. Also, while specific technologies are shown in these figures and described above (such as EXPERION, C300, HART, and EXCEL), other technologies could be used. For instance, other or additional control protocols could be used, such as FOUNDATION FIELDBUS, MODBUS, or PROFIBUS protocols.

Figure 12:
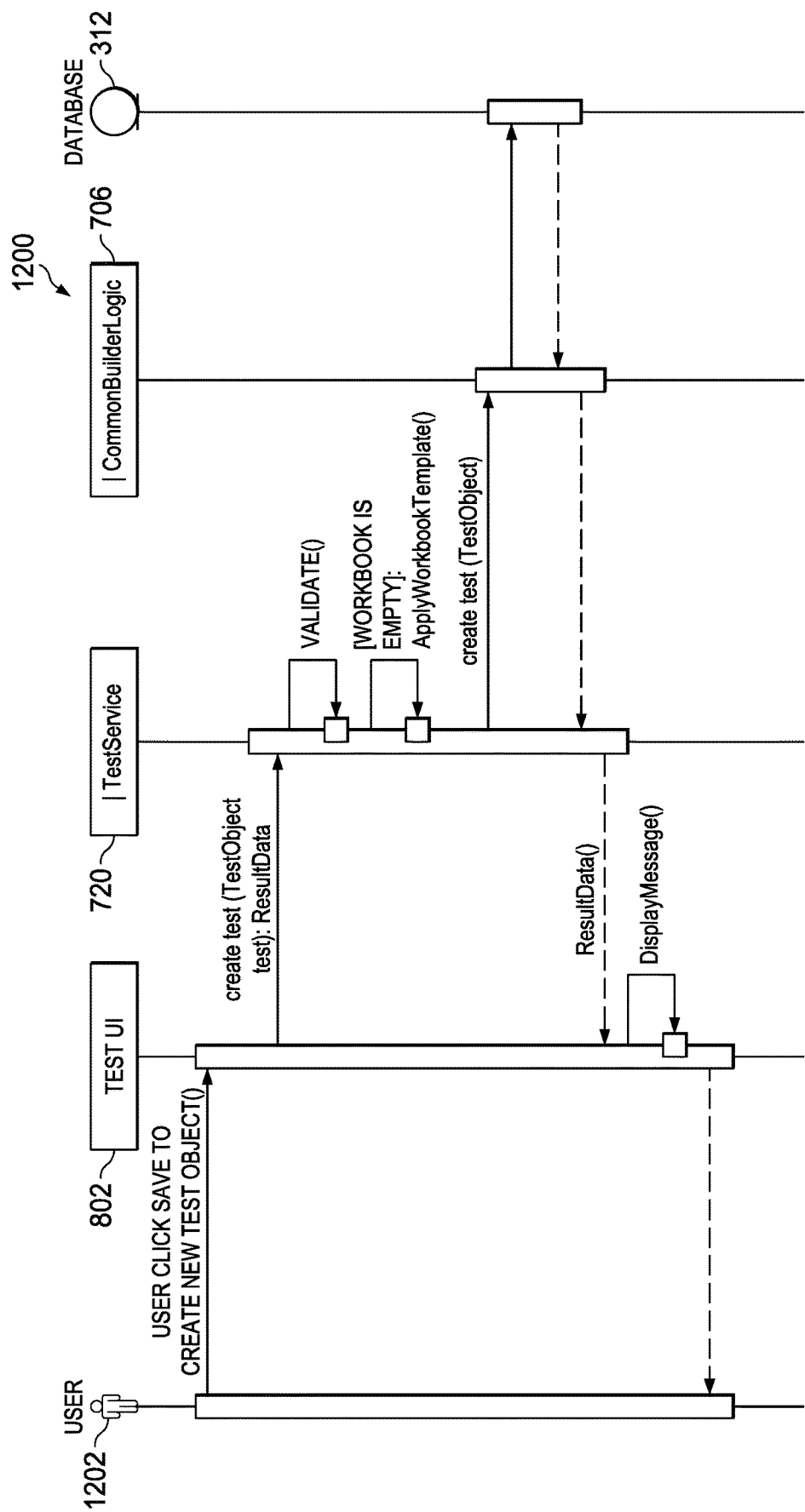
FIGS. 12 through 14 illustrate example sequence diagrams for an integrated testing mechanism in an industrial process control and automation system according to this disclosure.
Figure 13:
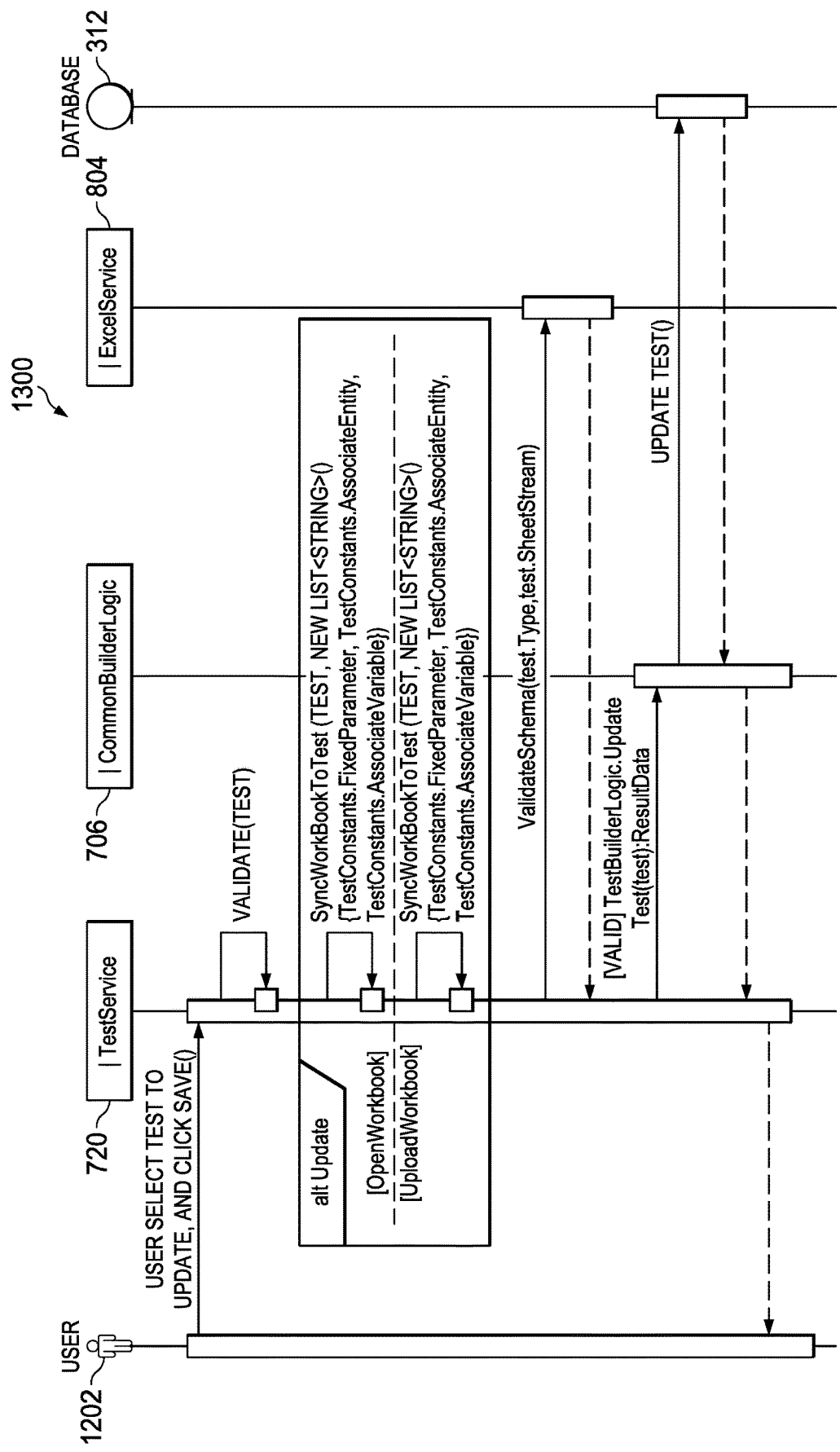
Figure 14:
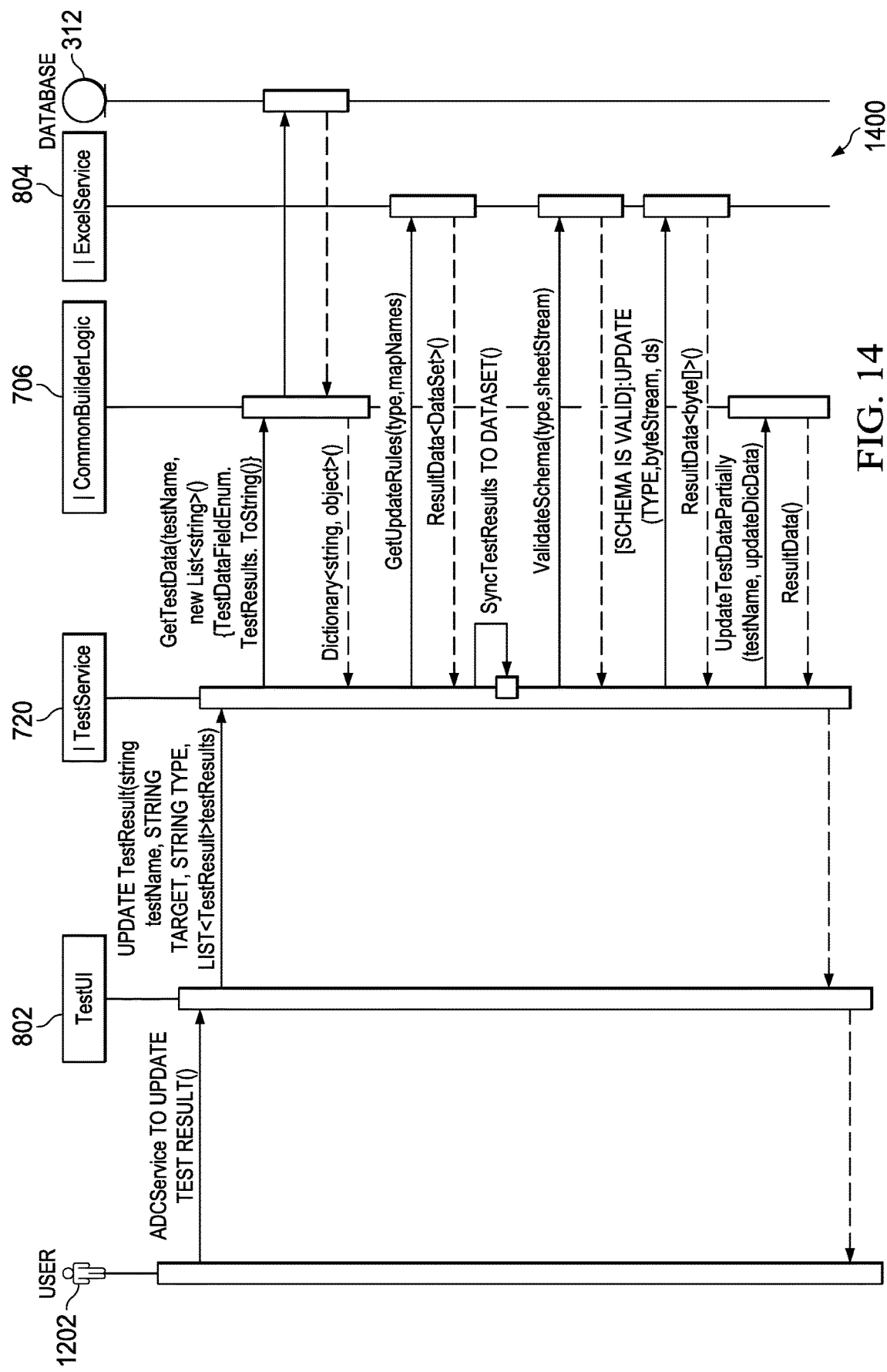

FIGS. 12 through 14 illustrate example sequence diagrams for an integrated testing mechanism in an industrial process control and automation system according to this disclosure. In particular, FIGS. 12 through 14 illustrate details of example usages of the testing infrastructure 144. For ease of explanation, the testing infrastructure 144 is described as being implemented in the system 100 of FIG. 1. However, the testing infrastructure 144 could be implemented in any suitable system.

As shown in FIG. 12, a sequence diagram 1200 illustrates how a test can be created by a user 1202. The user initiates the creation of one or more new test objects via the test workflow user interface 802, which initiates a create test object request with the test service 720. The test service 720 validates the request and creates a new workbook if necessary. The test service 720 also initiates the creation of the test object with the common builder 706, which creates and stores the test object in the data storage 312. An acknowledge is then sent from the common builder 706 through the test service 720 to the user interface 802, which presents a notification to the user.

As shown in FIG. 13, a sequence diagram 1300 illustrates how a test can be updated by the user 1202. The user initiates the update by selecting a test, making some type of modification to the test, and selecting an option to save the test. The test service 720 validates the updated test and updates the workbook associated with the updated test. Once the test is validated, the test service 720 interacts with the EXCEL service 804 to validate the EXCEL schema of the updated test. Assuming the schema is valid, the test service 720 saves the updated test object through the common builder 706, which stores the updated test object in the data storage 312. An acknowledge is then sent from the common builder 706 through the test service 720 to the user interface 802.

As shown in FIG. 14, a sequence diagram 1400 illustrates how results of a test can be updated and presented to the user 1202. The user provides a request for an update of the results of a test to the test workflow user interface 802, which issues an update request to the test service 720. The test service 720 interacts with the common builder 706 to obtain test data, which is retrieved from the data storage 312. The test service 720 obtains any updated rules from the EXCEL service 804, which are synchronized with a current dataset. After validation of the schema, the EXCEL service 804 is updated with the test results, and the common builder 706 is updated. The test results are provided from the test service 720 through the test interface 802 to the user 1202.

Although FIGS. 12 through 14 illustrate examples of sequence diagrams for an integrated testing mechanism in an industrial process control and automation system, various changes may be made to FIGS. 12 through 14. For example, the three specific workflows could be implemented in any other suitable manner, and a variety of other workflows could be supported within the integrated testing mechanism.

FIGS. 15 through 20 illustrate example graphical user interfaces of an integrated testing mechanism for industrial process control and automation systems according to this disclosure. The graphical user interfaces could, for example, be implemented by the testing infrastructure 144, such as within or as part of the user interface 802.

Figure 15:
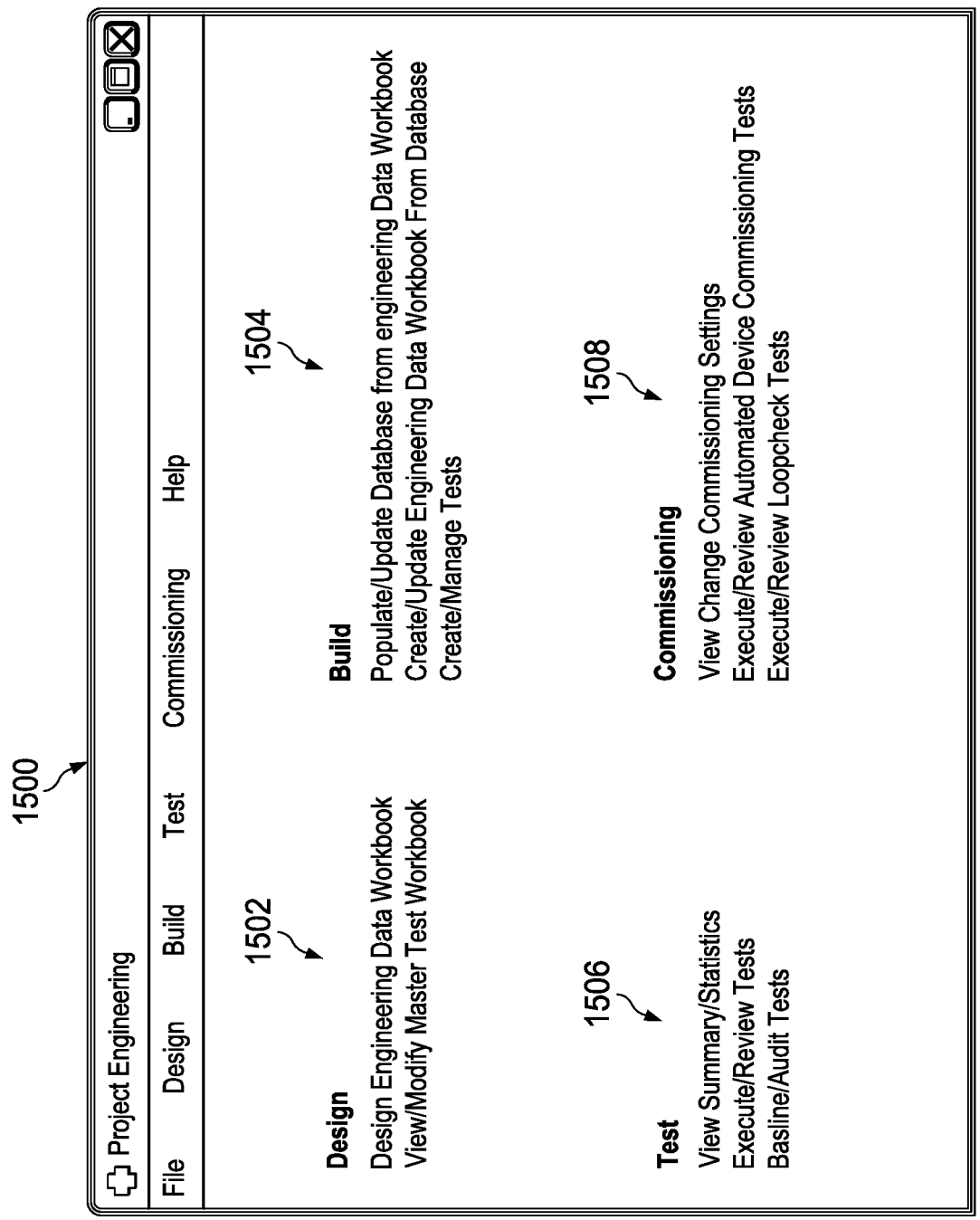

FIG. 15 illustrates an example graphical user interface 1500 representing a launch pad for invoking various functions of the testing infrastructure 144. The graphical user interface 1500 here includes options 1502 related to designing or viewing/modifying workbooks, such as creating or modifying test sheets or test typical sheets. The graphical user interface 1500 also includes options 1504 related to updating workbooks and databases and creating and managing tests. The graphical user interface 1500 further includes options 1506 related to executing tests and viewing test results. In addition, the graphical user interface 1500 includes options 1508 related to executing ADC tests and loop check tests for commissioning devices.

Figure 16:
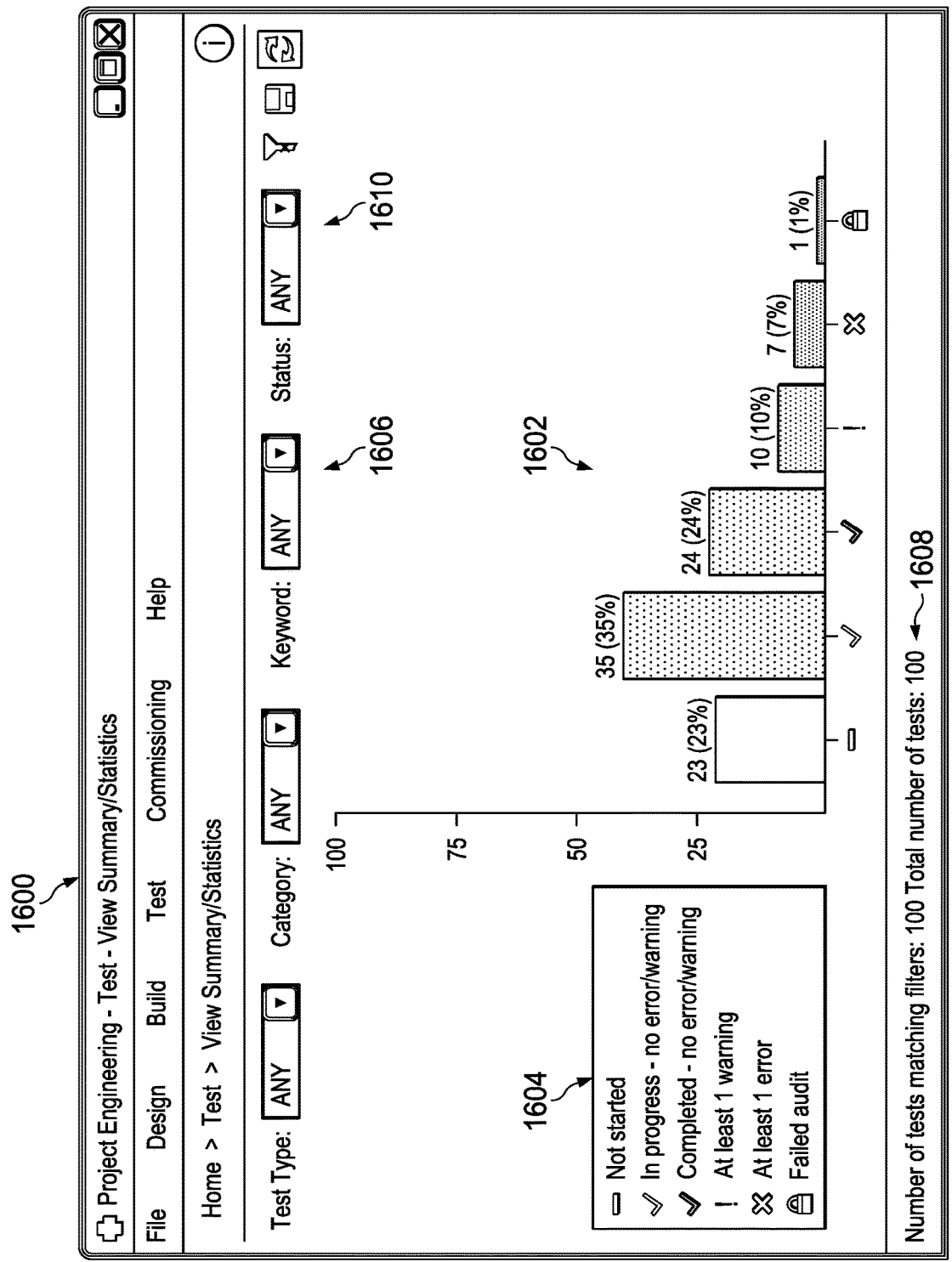

FIG. 16 illustrates an example graphical user interface 1600 that can be presented when the view summary/statistics function in the options 1506 is selected. As shown in FIG. 16, the graphical user interface 1600 includes a summary 1602 identifying the overall status of various tests. Here, the summary 1602 identifies the number of tests not started, the number of tests in progress, the number of tests completed without error, the numbers of tests completed with warnings or errors, and the number of tests that failed. Clicking on any of the bars in the summary 1602 could cause the graphical user interface 1600 to present a detailed list of tests associated with that bar. A legend 1604 identifies the different values in the summary 1602. Filtering options 1606 can be used to select tests based on various criteria, such as test type, category, keyword, and/or status (although other or additional filtering options could be used). A summary 1608 identifies a total number of defined tests and a total number of tests satisfying the filtering options 1606. Additional options 1610 can be used, for example, to support export and navigation functions or other functions.

Figure 17:
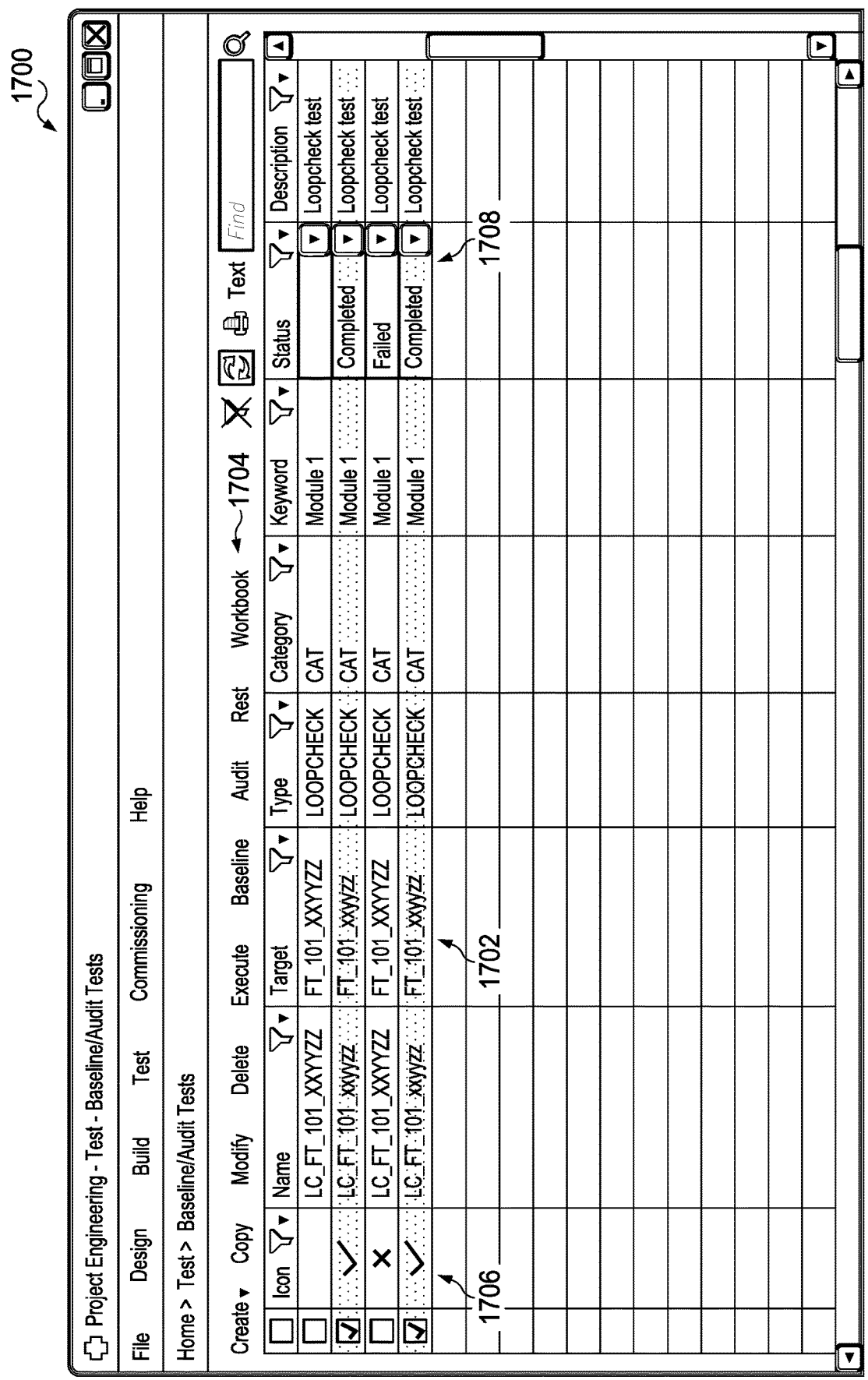

FIG. 17 illustrates an example graphical user interface 1700 that can be presented when the baseline/audit test function in the options 1506 is selected. As shown in FIG. 17, the graphical user interface 1700 includes a list 1702 of tests that could be selected for execution by a user. This view is one of several views that present filterable lists of tests for users to select and perform actions on. Commands that can be executed on selected tests are organized in a toolbar 1704 above the list 1702. This type of view can be accessed from different workflows, such as during design, build, test, and commissioning phases of a project lifecycle. Icons 1706 shown in the list 1702 represent both test results and baseline/audit status, which help users to see the overall progress of the test/commissioning tasks. In addition, a user-defined test status 1708 can be defined and assigned to any test at any time to further qualify any test, which can help the user to manage what needs to be done and see what has been completed. Any given test result shown in this view can actually represent a rolled-up combined summary of all sub-tests defined for an associated device. Details of the breakdown of the sub-tests and their results can be collected in an EXCEL workbook stored in a database.

FIG. 18 illustrates an example graphical user interface 1800 that can be presented when one of the tests in the list 1702 is selected by a user. The graphical user interface 1800 here includes a list 1802 of entities (such as functional configuration objects) associated with the selected test. Each object has an associated status 1804, which indicates when a baseline of the object was identified and (if appropriate) when an audit identified a change to the object. One of the objects here is identified as being modified, which means that the selected test should be re-executed. If no objects in the list 1802 are identified as being modified, prior test results for the test remain valid, so the test need not be re-executed.

Figure 19:
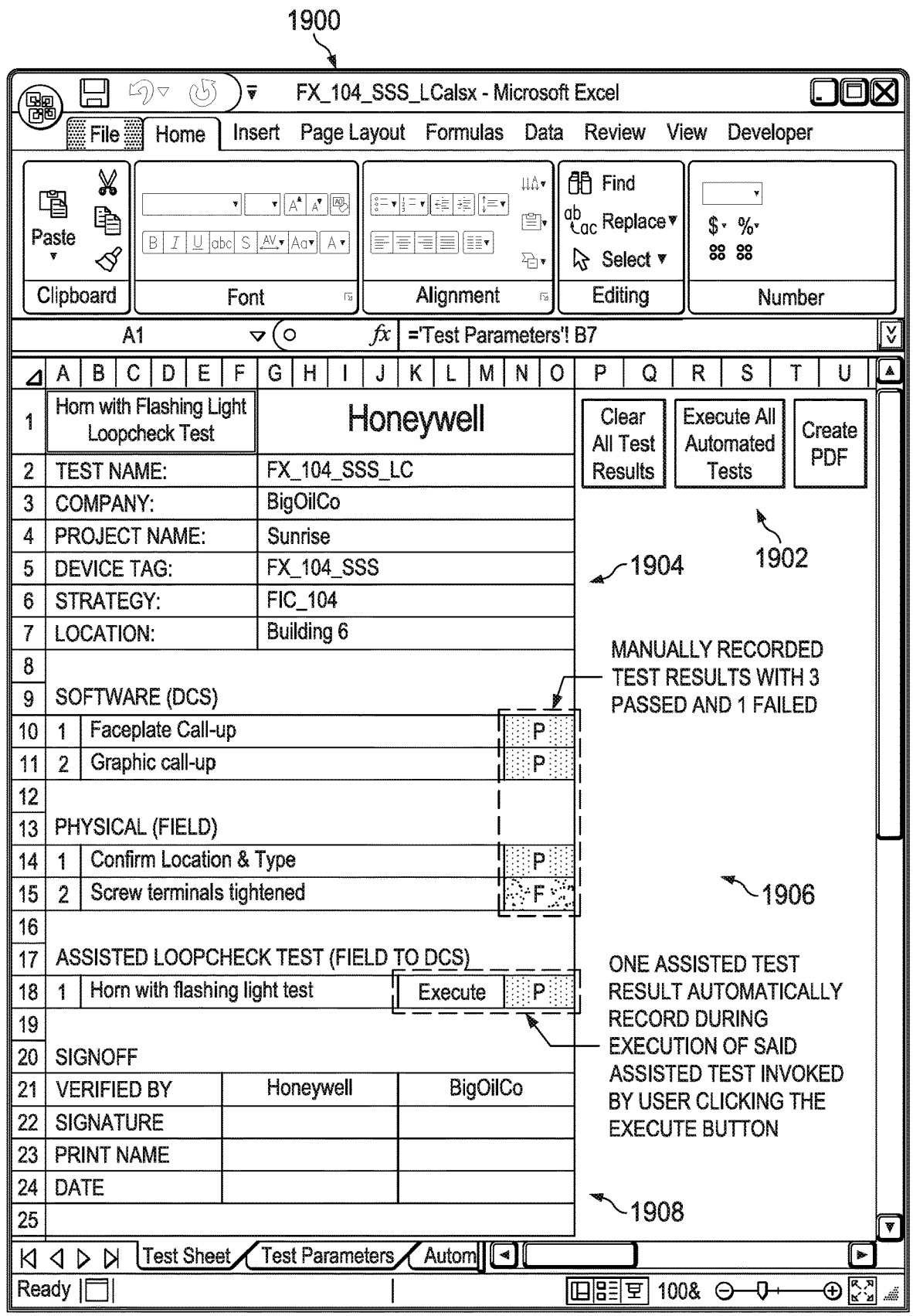

FIG. 19 illustrates an example workbook 1900 for a test, where results of all sub-tests performed (manually, automatically, or semi-automatically) to validate proper configuration and functionality of a given device being commissioned or otherwise tested are collected and presented for inspection. Buttons 1902 can be used to clear the test results, initiate execution of an automated or assisted test, and create a PDF or other document of the test results. Relevant guidance or instructions can be provided next to the actual test results. Details 1904 provide information about the test, and results 1906 identify the results of various sub-tests. An overall test result can be generated based on the results 1906, and the overall test result can be automatically updated whenever new sub-test results are collected and can be published so it is viewable in a summary or statistics view. A signoff section 1908 can be used to receive identifying information for people who have reviewed and verified the test results.

FIG. 20 illustrates an example graphical user interface 2000 that can be presented when the execute/review ADC test function in the options 1508 is selected. As shown in FIG. 20, the graphical user interface 2000 is associated with a specific ADC test for a given cabinet, which contains multiple I/O modules (each with 32 devices coupled to it). The graphical user interface 2000 guides a user though a workflow that involves interrogate/match, assign/load, configure devices, perform automated loop checks, and perform assisted loop checks functions. In this example, the first three functions have been completed, and the user is about to proceed with the automated loop checks sub-step. More details about each sub-step and the overall ADC operation can be provided to the user as needed or required.

Although FIGS. 15 through 20 illustrate examples of graphical user interfaces of an integrated testing mechanism for industrial process control and automation systems, various changes may be made to FIGS. 15 through 20. For example, each graphical user interface could include any other or additional information according to particular needs.

Figure 21:
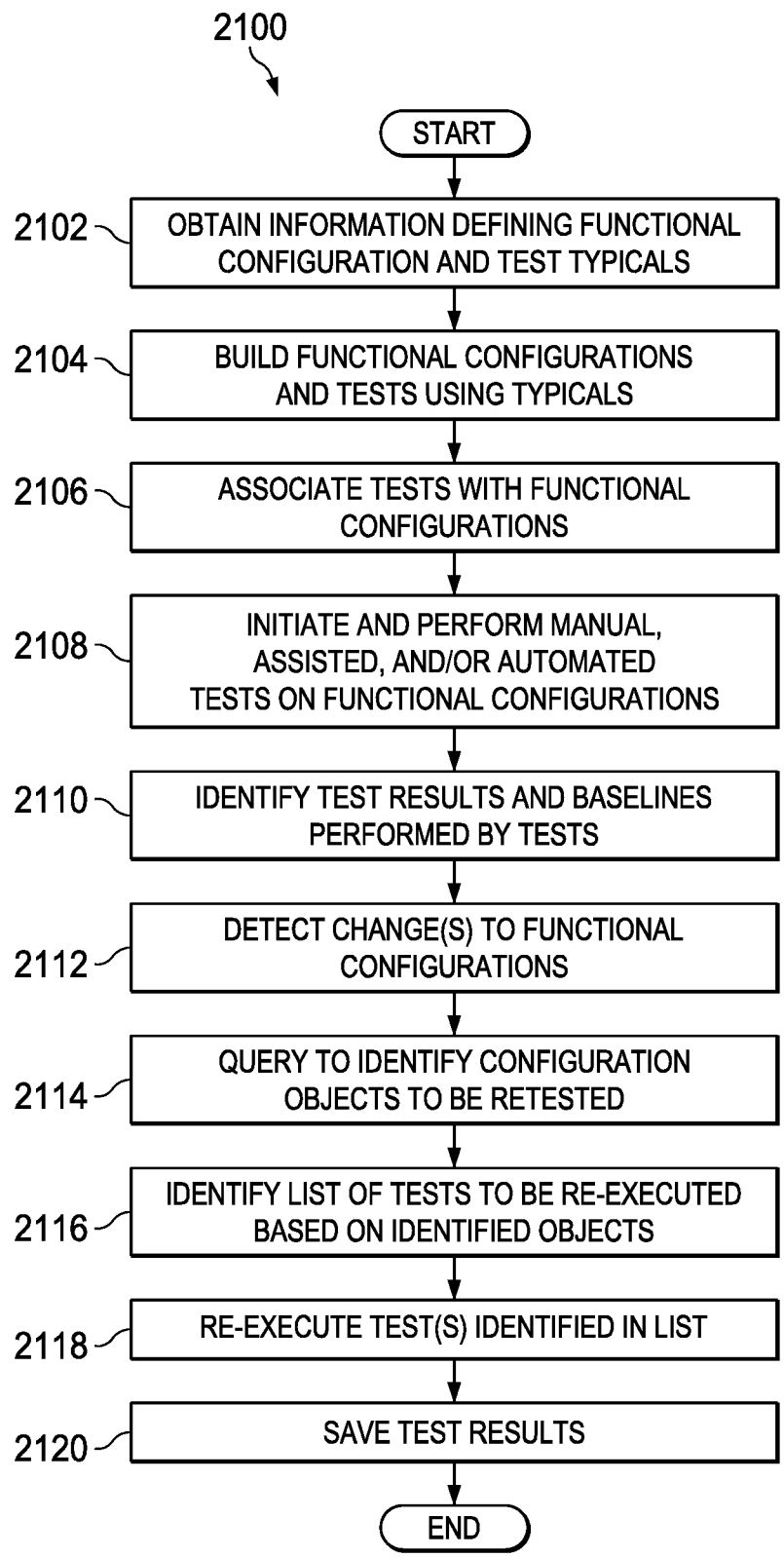
FIG. 21 illustrates an example method for supporting an integrated testing mechanism in an industrial process control and automation system according to this disclosure.

FIG. 21 illustrates an example method 2100 for supporting an integrated testing mechanism in an industrial process control and automation system according to this disclosure. For ease of explanation, the method 2100 is described as being implemented using the device 200 of FIG. 2 in the system 100 of FIG. 1. However, the method 2100 could be implemented using any suitable device and in any suitable system.

As shown in FIG. 21, information identifying typical functional configurations and tests at step 2102. This could include, for example, the processor 202 of the testing infrastructure 144 receiving information from a user identifying common functional configuration objects defining control operations performed by controllers or other devices in a control and automation system. This could also include the processor 202 of the testing infrastructure 144 receiving information from the user identifying common tests, such as test typical sheets 806. Functional components and tests are generated using the typical functional configurations and tests at step 2104. This could include, for example, the processor 202 of the testing infrastructure 144 generating the functional configurations as collections of objects and the tests as test sheets 808. The tests are associated with the functional configurations at step 2106. This could include, for example, the processor 202 of the testing infrastructure 144 identifying the functional configuration objects of the functional configurations that are accessed or used by each of the tests.

Manual, assisted, and/or automated tests are initiated at step 2108. This could include, for example, the processor 202 of the testing infrastructure 144 initiating different tests, which may or may not involve receiving user input as part of the testing. Test results and baselines for the tests are identified at step 2110. This could include, for example, the processor 202 of the testing infrastructure 144 identifying results for different sub-tests of each test (possibly based on manually-recorded results), where the tests involve one or more field devices 506 or other hardware in a control and automation system.

One or more changes to the functional configurations are identified at step 2112. This could include, for example, the change detection module 310 detecting any changes to the functional configuration objects. At some point, a query can be made to identify the functional configuration objects that have changed and require retesting at step 2114. Based on the identified functional configuration objects, a list of tests to be re-executed can be identified at step 2116, and those tests can be re-executed at step 2118. This could include, for example, the processor 202 of the testing infrastructure 144 re-executing any test involving a functional configuration object that has changed.

The test results are saved at step 2120. This could include, for example, the processor 202 of the testing infrastructure 144 storing the initial test results, baselines, and re-executed test results in a persistent storage. The test results can be used in any suitable manner, such as to generate reports for users.

Although FIG. 21 illustrates one example of a method 2100 for supporting an integrated testing mechanism in an industrial process control and automation system, various changes may be made to FIG. 21. For example, while shown as a series of steps, various steps in FIG. 21 could overlap, occur in parallel, occur in a different order, or occur any number of times.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   receiving information defining multiple functional configurations associated with an industrial process control and automation system, the functional configurations identifying operations to be performed by the control and automation system, wherein each functional configuration comprises one or more functional configuration objects;
   receiving, at a test system integrated in the control and automation system, information defining multiple tests to be performed on the control and automation system;
   executing the tests using the test system, the test system accessing data from both the test system and the control and automation system;
   detecting one or more changes to at least one functional configuration object of at least one of the functional configurations;
   re-executing any test referencing a changed functional configuration object; and
   maintaining as valid prior test results any test that does not reference a changed functional configuration object.

2. The method of claim 1, wherein the information defining the multiple tests comprises information defining at least one of:
   one or more automated tests in which all test operations are performed automatically and all test results are recorded automatically;
   one or more manual tests in which all test operations are performed manually and all test results are recorded manually; and
   one or more assisted tests in which some test operations are performed automatically or some test results are recorded automatically.

3. The method of claim 2, wherein the information defining the multiple tests comprises information defining at least two of the one or more automated tests, the one or more manual tests, and the one or more assisted tests.

4. The method of claim 1, further comprising:
   recording results of each of the tests in a user-defined format.

5. The method of claim 1, wherein receiving the information defining the multiple tests comprises:

receiving information defining a test typical sheet; and generating at least two test sheets using the test typical sheet, the at least two test sheets defining at least two of the multiple tests and storing test results for the at least two tests.

6. An apparatus comprising:

at least one processor configured to execute instructions for a test system integrated within an industrial process control and automation system, the at least one processor configured to:

receive information defining multiple functional configurations associated with the control and automation system, the functional configurations identifying operations to be performed by the control and automation system, wherein each functional configuration comprises one or more functional configuration objects;

receive information defining multiple tests to be performed on the control and automation system; and execute the tests while accessing data from both the test system and the control and automation system;

detect one or more changes to at least one functional configuration object of at least one of the functional configurations;

re-execute any test referencing a changed functional configuration object; and maintain as valid prior test results any test that does not reference a changed functional configuration object.

7. The apparatus of claim 6, wherein the information defining the multiple tests comprises information defining at least one of:

one or more automated tests in which all test operations are performed automatically and all test results are recorded automatically;

one or more manual tests in which all test operations are performed manually and all test results are recorded manually; and one or more assisted tests in which some test operations are performed automatically or some test results are recorded automatically.

8. The apparatus of claim 7, wherein the information defining the multiple tests comprises information defining at least two of the one or more automated tests, the one or more manual tests, and the one or more assisted tests.

9. The apparatus of claim 6, wherein the at least one processor is further configured to record results of each of the tests in a user-defined format.

10. The apparatus of claim 6, wherein, to receive the information defining the multiple tests, the at least one processor is configured to:

receive information defining a test typical sheet; and generate at least two test sheets using the test typical sheet, the at least two test sheets defining at least two of the multiple tests and storing test results for the at least two tests.

11. A non-transitory computer readable medium containing instructions that, when executed by one or more processors, cause the one or more processors to:

receive information defining multiple functional configurations associated with an industrial process control and automation system, the functional configurations identifying operations to be performed by the control and automation system, wherein each functional configuration comprises one or more functional configuration objects;

receive, at a test system integrated in the control and automation system, information defining multiple tests to be performed on the control and automation system; and execute the tests using the test system, the test system accessing data from both the test system and the control and automation system;

detect one or more changes to at least one functional configuration object of at least one of the functional configurations;

re-execute any test referencing a changed functional configuration object; and maintain as valid prior test results any test that does not reference a changed functional configuration object.

12. The non-transitory computer readable medium of claim 11, wherein the information defining the multiple tests comprises information defining at least one of:

one or more automated tests in which all test operations are performed automatically and all test results are recorded automatically;

one or more manual tests in which all test operations are performed manually and all test results are recorded manually; and one or more assisted tests in which some test operations are performed automatically or some test results are recorded automatically.

13. The non-transitory computer readable medium of claim 11, further containing instructions that, when executed by the one or more processors, cause the one or more processors to record results of each of the tests in a user-defined format.

14. The non-transitory computer readable medium of claim 11, further containing instructions that, when executed by the one or more processors, cause the one or more processors to:

receive information defining a test typical sheet; and generate at least two test sheets using the test typical sheet, the at least two test sheets defining at least two of the multiple tests and storing test results for the at least two tests.

* * * * *